US012639972B2

(12) United States Patent
Li et al.

(10) Patent No.: US 12,639,972 B2
(45) Date of Patent: May 26, 2026

(54) SYSTEMS AND METHODS FOR VALUE EXTRACTION AND GUIDED REVIEW

(71) Applicant: PATRA CORPORATION, El Dorado Hills, CA (US)

(72) Inventors: Tony Li, El Dorado Hills, CA (US); Juan Cristian Martinez Vega, El Dorado Hills, CA (US)

(73) Assignee: Patra Corporation, El Dorado Hills, CA (US)

( * ) Notice: Subject to any disclaimer, the term of this patent is extended or adjusted under 35 U.S.C. 154(b) by 574 days.

(21) Appl. No.: 18/175,808

(22) Filed: Feb. 28, 2023

(65) Prior Publication Data

US 2023/0274570 A1     Aug. 31, 2023

Related U.S. Application Data

(60) Provisional application No. 63/268,686, filed on Feb. 28, 2022.

(51) Int. Cl.
*G06V 30/418*     (2022.01)
*G06V 30/18*      (2022.01)
*G06V 30/414*     (2022.01)

(52) U.S. Cl.
CPC ............ *G06V 30/418* (2022.01); *G06V 30/18* (2022.01); *G06V 30/414* (2022.01)

(58) Field of Classification Search
CPC ...... G06V 30/10; G06V 30/18; G06V 30/414; G06V 30/418; G06F 16/30
See application file for complete search history.

(56) References Cited

U.S. PATENT DOCUMENTS

| | | | |
|---|---|---|---|
| 11,948,342 B2 * | 4/2024 | Yamanaka | ........... G06V 10/273 |
| 2016/0239846 A1 | 8/2016 | Arvapally et al. | |

(Continued)

OTHER PUBLICATIONS

International Search Report dated Jun. 7, 2023 issued in related PCT App. No. PCT/US2023/063397 (2 pages).

(Continued)

*Primary Examiner* — Daniel G Mariam
(74) *Attorney, Agent, or Firm* — Haynes and Boone, LLP; Robert P. Ziemian

(57) ABSTRACT

A method of automatic extraction of values includes scanning a document and linking a first word of a plurality of words in the document, to each word of the plurality of words in the document positionally adjacent to the right, left, top, bottom of the first word. The method further includes repeating said scanning and linking for every word of the plurality of words in the document. The method further includes determining the x and y coordinate in the document for each of the plurality of words. The method further includes providing a plurality of checklist words corresponding to information of interest. The method further includes searching the plurality of words in the document for each of the plurality of checklist words. The method further includes for each checklist word found in the plurality of words of the documents determining if a linked positionally adjacent words to the right, left, top, bottom is a value that matches typical values for the plurality of checklist words and if so, extract said value. The method further includes directing a user interface to position in the document related to content of interest related to at least one of the plurality of checklist words.

20 Claims, 29 Drawing Sheets

(56) References Cited

U.S. PATENT DOCUMENTS

| | | |
|---|---|---|
| 2017/0075877 A1 | 3/2017 | Lepeltier |
| 2018/0309795 A1 | 10/2018 | Ithal et al. |
| 2021/0042518 A1 | 2/2021 | Khandekar |

OTHER PUBLICATIONS

International Written Opinion dated Jun. 7, 2023 issued in related PCT App. No. PCT/US2023/063397 (5 pages).

* cited by examiner

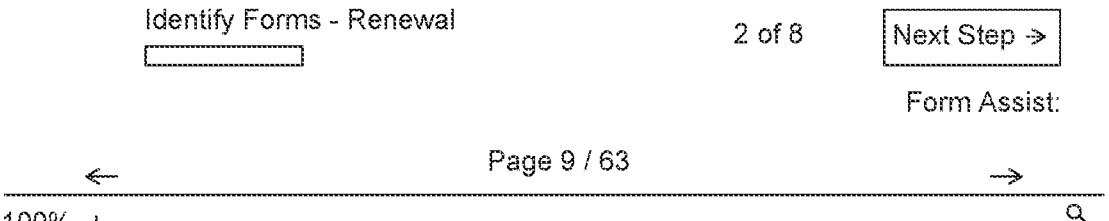
Identify Forms - Renewal
2 of 8      Next Step →
Form Assist:
← Page 9 / 63 →
100% +      🔍
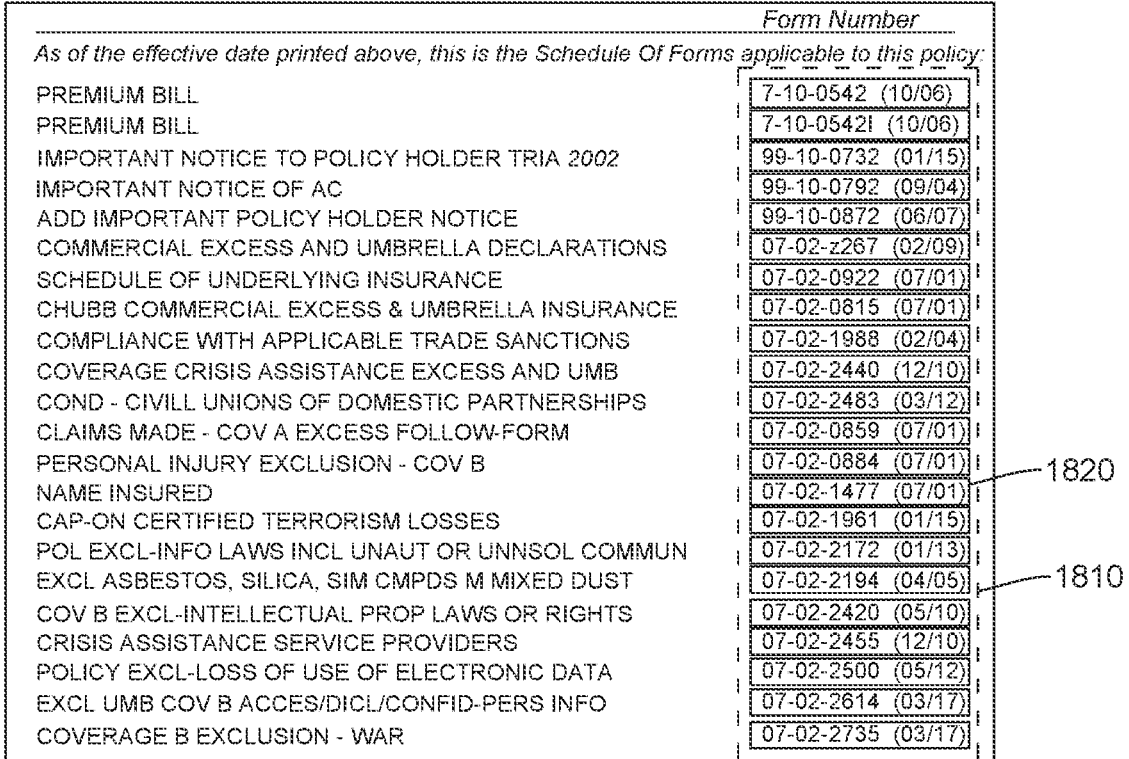
FIG. 18

Renewal

100%  +  $\mathsf{Q}$

C H U B B° *Chubb Commercial Excess And Umbrella Insurance*

*Schedule of Forms*

| | |
|---|---|
| *Policy Period* | JANUARY1 2021   To   JANUARY1 2022 |
| *Effective Date* | JANUARY |
| *Policy Number* | 9366-47-12 |
| *Insured* | IDENTITY |
| *Name of Company* | FEDERAL INSURANCE COMPANY |
| *Date Issued* | October 19, 2020 |

*As of the effective date printed above, this is the Schedule Of Forms applicable to this policy:*

| | Form Number |
|---|---|
| PREMIUM BILL | 7-10-0542  (10/06) |
| PREMIUM BILL | 7-10-05421  (10/06) |
| IMPORTANT NOTICE TO POLICY HOLDER TRIA 2002 | 99-10-0732  (01/15) |
| IMPORTANT NOTICE OF AC | 99-10-0792  (09/04) |
| ADD IMPORTANT POLICY HOLDER NOTICE | 99-10-0872  (06/07) |
| COMMERCIAL EXCESS AND UMBRELLA DECLARATIONS | 07-02-z267  (02/09) |
| SCHEDULE OF UNDERLYING INSURANCE | 07-02-0922  (07/01) |
| CHUBB COMMERCIAL EXCESS & UMBRELLA INSURANCE | 07-02-0815  (07/01) |
| COMPLIANCE WITH APPLICABLE TRADE SANCTIONS | 07-02-1988  (02/04) |
| COVERAGE CRISIS ASSISTANCE EXCESS AND UMB | 07-02-2440  (12/10) |
| COND - CIVILL UNIONS OF DOMESTIC PARTNERSHIPS | 07-02-2483  (03/12) |
| CLAIMS MADE - COV A EXCESS FOLLOW-FORM | 07-02-0859  (07/01) |
| PERSONAL INJURY EXCLUSION - COV B | 07-02-0884  (07/01) |
| NAME INSURED | 07-02-1477  (07/01) |
| CAP-ON CERTIFIED TERRORISM LOSSES | 07-02-1961  (01/15) |
| POL EXCL-INFO LAWS INCL UNAUT OR UNNSOL COMMUN | 07-02-2172  (01/13) |
| EXCL ASBESTOS, SILICA, SIM CMPDS M MIXED DUST | 07-02-2194  (04/05) |
| COV B EXCL-INTELLECTUAL PROP LAWS OR RIGHTS | 07-02-2420  (05/10) |
| CRISIS ASSISTANCE SERVICE PROVIDERS | 07-02-2455  (12/10) |
| POLICY EXCL-LOSS OF USE OF ELECTRONIC DATA | 07-02-2500  (05/12) |
| EXCL UMB COV B ACCES/DICL/CONFID-PERS INFO | 07-02-2614  (03/17) |
| COVERAGE B EXCLUSION - WAR | 07-02-2735  (03/17) |

← 19 Form Pairs left to compare.

07-10-0542 (10/06)

07-10-0542 (10/06)

Does this Form pair match?

| No | | Yes |

FIG. 22A

← 3 Form Pairs left to compare.

IL T3 68 01 21

IL T3 68 01 15

Does this Form pair have an Edition Mismatch?

| No | | Yes |

FIG. 22B

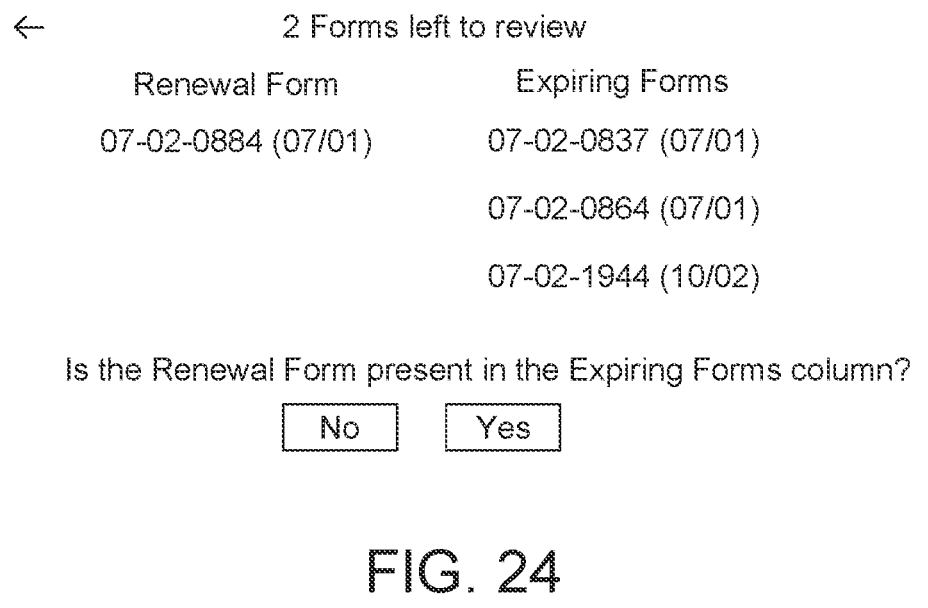

←           2 Forms left to review

Renewal Form          Expiring Forms 07-02-0884 (07/01)      07-02-0837 (07/01)

07-02-0864 (07/01)

07-02-1944 (10/02)

Is the Renewal Form present in the Expiring Forms column?

| No | Yes |

FIG. 24

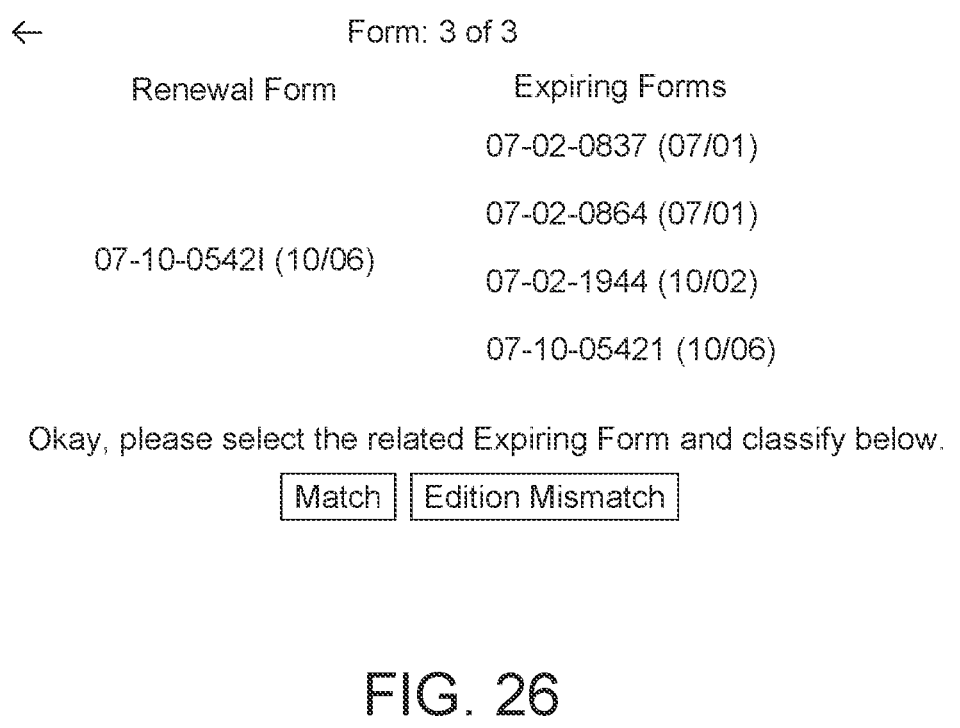

← Form: 3 of 3

Renewal Form                Expiring Forms 07-02-0837 (07/01)

07-02-0864 (07/01)

07-10-0542I (10/06)        07-02-1944 (10/02)

07-10-05421 (10/06)

Okay, please select the related Expiring Form and classify below.

| Match | | Edition Mismatch |

FIG. 26

←            Form: 3 of 3
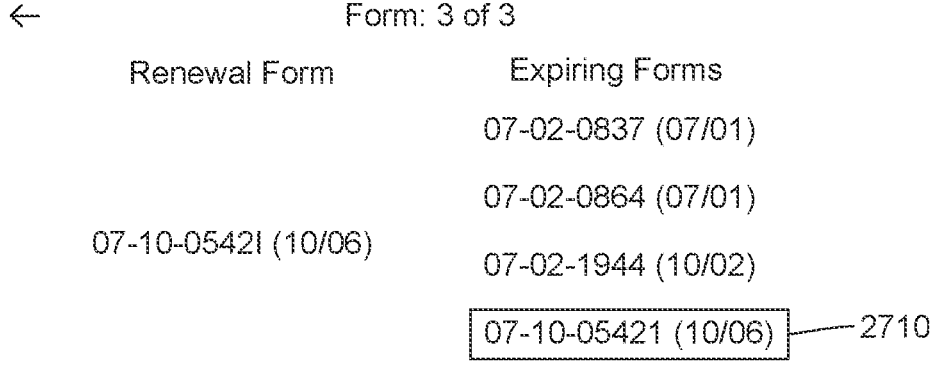
Renewal Form          Expiring Forms
07-02-0837 (07/01)
07-02-0864 (07/01)
07-10-0542I (10/06)      07-02-1944 (10/02)
07-10-05421 (10/06) ——2710
Okay, please select the related Expiring Form and Classify below.
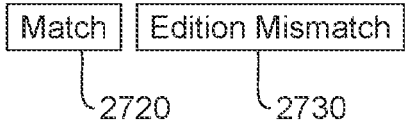
Match    Edition Mismatch
2720       2730
FIG. 27

Page 1 of 2

←        →

Renewal

100% +                ⌕

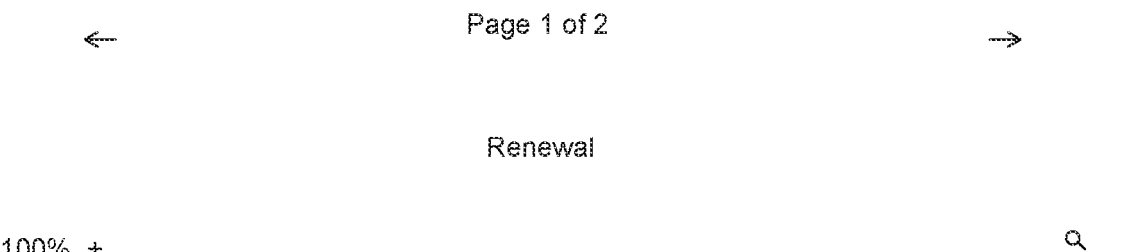

C H U B B° *Chubb Commercial Excess And Umbrella Insurance*

*Schedule of Forms*

*Policy Period*      JANUARY1 2021   To   JANUARY1 2022
*Effective Date*      JANUARY
*Policy Number*    9366-47-12
*Insured*           IDENTITY
*Name of Company* FEDERAL INSURANCE COMPANY
*Date Issued*        October 19, 2020

|  | *Form Number* |
|---|---|
| *As of the effective date printed above, this is the Schedule Of Forms applicable to this policy:* | |
| PREMIUM BILL | 7-10-0542 (10/06) |
| PREMIUM BILL | 7-10-0542I (10/06) |
| IMPORTANT NOTICE TO POLICY HOLDER TRIA 2002 | 99-10-0732 (01/15) |
| IMPORTANT NOTICE OF AC | 99-10-0792 (09/04) |
| ADD IMPORTANT POLICY HOLDER NOTICE | 99-10-0872 (06/07) |
| COMMERCIAL EXCESS AND UMBRELLA DECLARATIONS | 07-02-z267 (02/09) |
| SCHEDULE OF UNDERLYING INSURANCE | 07-02-0922 (07/01) |
| CHUBB COMMERCIAL EXCESS & UMBRELLA INSURANCE | 07-02-0815 (07/01) |
| COMPLIANCE WITH APPLICABLE TRADE SANCTIONS | 07-02-1988 (02/04) |
| COVERAGE CRISIS ASSISTANCE EXCESS AND UMB | 07-02-2440 (12/10) |
| COND - CIVILL UNIONS OF DOMESTIC PARTNERSHIPS | 07-02-2483 (03/12) |
| CLAIMS MADE - COV A EXCESS FOLLOW-FORM | 07-02-0859 (07/01) |
| PERSONAL INJURY EXCLUSION - COV B | 07-02-0884 (07/01) |
| NAME INSURED | 07-02-1477 (07/01) |
| CAP-ON CERTIFIED TERRORISM LOSSES | 07-02-1961 (01/15) |
| POL EXCL-INFO LAWS INCL UNAUT OR UNNSOL COMMUN | 07-02-2172 (01/13) |
| EXCL ASBESTOS, SILICA, SIM CMPDS M MIXED DUST | 07-02-2194 (04/05) |
| COV B EXCL-INTELLECTUAL PROP LAWS OR RIGHTS | 07-02-2420 (05/10) |
| CRISIS ASSISTANCE SERVICE PROVIDERS | 07-02-2455 (12/10) |
| POLICY EXCL-LOSS OF USE OF ELECTRONIC DATA | 07-02-2500 (05/12) |
| EXCL UMB COV B ACCES/DICL/CONFID-PERS INFO | 07-02-2614 (03/17) |
| COVERAGE B EXCLUSION - WAR | 07-02-2735 (03/17) |

C H U B B°  *Chubb Commercial Excess And Umbrella Insurance*

*Schedule of Forms*

*Policy Period  JANUARY1 2021  To  JANUARY1 2022*

*As of the effective date printed above, this is the Schedule Of Forms applicable to this policy:*

| | |
|---|---|
| PREMIUM BILL | 7-10-0542  (10/06) |
| PREMIUM BILL | 7-10-0542I  (10/06) |
| IMPORTANT NOTICE TO POLICY HOLDER TRIA 2002 | 99-10-0732  (01/15) |
| IMPORTANT NOTICE OF AC | 99-10-0792  (09/04) |
| ADD IMPORTANT POLICY HOLDER NOTICE | 99-10-0872  (06/07) |
| COMMERCIAL EXCESS AND UMBRELLA DECLARATIONS | 07-02-z267  (02/09) |
| SCHEDULE OF UNDERLYING INSURANCE | 07-02-0922  (07/01) |
| CHUBB COMMERCIAL EXCESS & UMBRELLA INSURANCE | 07-02-0815  (07/01) |
| COMPLIANCE WITH APPLICABLE TRADE SANCTIONS | 07-02-1988  (02/04) |
| COVERAGE CRISIS ASSISTANCE EXCESS AND UMB | 07-02-2440  (12/10) |
| COND - CIVILL UNIONS OF DOMESTIC PARTNERSHIPS | 07-02-2483  (03/12) |
| CLAIMS MADE - COV A EXCESS FOLLOW-FORM | 07-02-0859  (07/01) |
| PERSONAL INJURY EXCLUSION - COV B | 07-02-0884  (07/01) |
| NAME INSURED | 07-02-1477  (07/01) |
| CAP-ON CERTIFIED TERRORISM LOSSES | 07-02-1961  (01/15) |
| POL EXCL-INFO LAWS INCL UNAUT OR UNNSOL COMMUN | 07-02-2172  (01/13) |
| EXCL ASBESTOS, SILICA, SIM CMPDS M MIXED DUST | 07-02-2194  (04/05) |
| COV B EXCL-INTELLECTUAL PROP LAWS OR RIGHTS | 07-02-2420  (05/10) |
| CRISIS ASSISTANCE SERVICE PROVIDERS | 07-02-2455  (12/10) |
| POLICY EXCL-LOSS OF USE OF ELECTRONIC DATA | 07-02-2500  (05/12) |
| EXCL UMB COV B ACCES/DICL/CONFID-PERS INFO | 07-02-2614  (03/17) |
| COVERAGE B EXCLUSION - WAR | 07-02-2735  (03/17) |

[ Close ]    [ Save ]

| | |
|---|---|
| CRISIS ASSISTANCE SERVICE PROVIDERS | 07-02-2455  (12/10) |
| POLICY EXCL-LOSS OF USE OF ELECTRONIC DATA | 07-02-2500  (05/12) |
| EXCL UMB COV B ACCES/DICL/CONFID-PERS INFO | 07-02-2614  (03/17) |
| COVERAGE B EXCLUSION - WAR | 07-02-2735  (03/17) |

FIG. 30

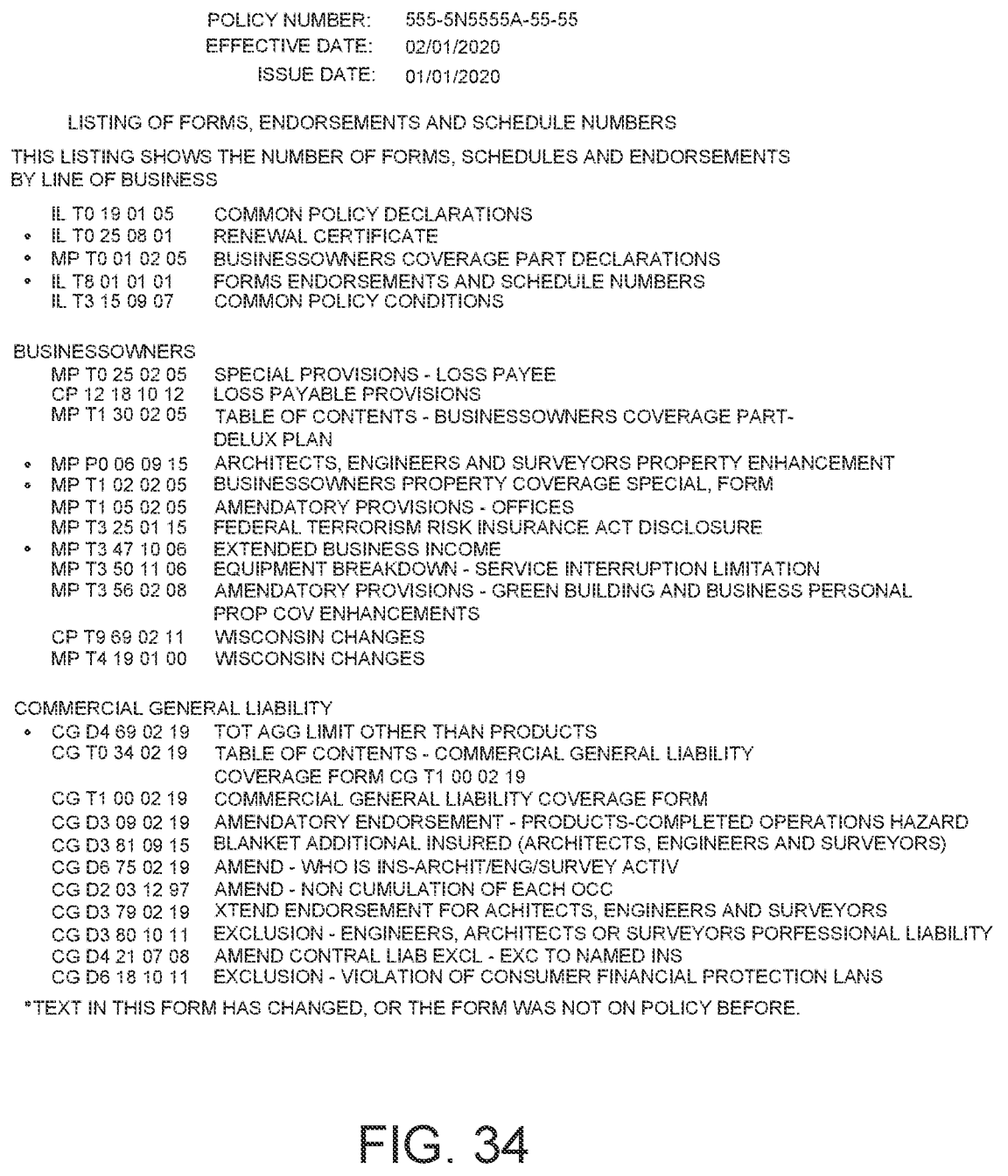

POLICY NUMBER:    555-5N5555A-55-55
EFFECTIVE DATE:    02/01/2020
ISSUE DATE:    01/01/2020

LISTING OF FORMS, ENDORSEMENTS AND SCHEDULE NUMBERS

THIS LISTING SHOWS THE NUMBER OF FORMS, SCHEDULES AND ENDORSEMENTS
BY LINE OF BUSINESS

|  | IL T0 19 01 05 | COMMON POLICY DECLARATIONS |
| ∘ | IL T0 25 08 01 | RENEWAL CERTIFICATE |
| ∘ | MP T0 01 02 05 | BUSINESSOWNERS COVERAGE PART DECLARATIONS |
| ∘ | IL T8 01 01 01 | FORMS ENDORSEMENTS AND SCHEDULE NUMBERS |
|  | IL T3 15 09 07 | COMMON POLICY CONDITIONS |

BUSINESSOWNERS

|  | MP T0 25 02 05 | SPECIAL PROVISIONS - LOSS PAYEE |
|  | CP 12 18 10 12 | LOSS PAYABLE PROVISIONS |
|  | MP T1 30 02 05 | TABLE OF CONTENTS - BUSINESSOWNERS COVERAGE PART-DELUX PLAN |
| ∘ | MP P0 06 09 15 | ARCHITECTS, ENGINEERS AND SURVEYORS PROPERTY ENHANCEMENT |
| ∘ | MP T1 02 02 05 | BUSINESSOWNERS PROPERTY COVERAGE SPECIAL, FORM |
|  | MP T1 05 02 05 | AMENDATORY PROVISIONS - OFFICES |
|  | MP T3 25 01 15 | FEDERAL TERRORISM RISK INSURANCE ACT DISCLOSURE |
| ∘ | MP T3 47 10 06 | EXTENDED BUSINESS INCOME |
|  | MP T3 50 11 06 | EQUIPMENT BREAKDOWN - SERVICE INTERRUPTION LIMITATION |
|  | MP T3 56 02 08 | AMENDATORY PROVISIONS - GREEN BUILDING AND BUSINESS PERSONAL PROP COV ENHANCEMENTS |
|  | CP T9 69 02 11 | WISCONSIN CHANGES |
|  | MP T4 19 01 00 | WISCONSIN CHANGES |

COMMERCIAL GENERAL LIABILITY

| ∘ | CG D4 69 02 19 | TOT AGG LIMIT OTHER THAN PRODUCTS |
|  | CG T0 34 02 19 | TABLE OF CONTENTS - COMMERCIAL GENERAL LIABILITY COVERAGE FORM CG T1 00 02 19 |
|  | CG T1 00 02 19 | COMMERCIAL GENERAL LIABILITY COVERAGE FORM |
|  | CG D3 09 02 19 | AMENDATORY ENDORSEMENT - PRODUCTS-COMPLETED OPERATIONS HAZARD |
|  | CG D3 81 09 15 | BLANKET ADDITIONAL INSURED (ARCHITECTS, ENGINEERS AND SURVEYORS) |
|  | CG D6 75 02 19 | AMEND - WHO IS INS-ARCHIT/ENG/SURVEY ACTIV |
|  | CG D2 03 12 97 | AMEND - NON CUMULATION OF EACH OCC |
|  | CG D3 79 02 19 | XTEND ENDORSEMENT FOR ACHITECTS, ENGINEERS AND SURVEYORS |
|  | CG D3 80 10 11 | EXCLUSION - ENGINEERS, ARCHITECTS OR SURVEYORS PORFESSIONAL LIABILITY |
|  | CG D4 21 07 08 | AMEND CONTRAL LIAB EXCL - EXC TO NAMED INS |
|  | CG D6 18 10 11 | EXCLUSION - VIOLATION OF CONSUMER FINANCIAL PROTECTION LANS |

*TEXT IN THIS FORM HAS CHANGED, OR THE FORM WAS NOT ON POLICY BEFORE.

FIG. 34

SYSTEMS AND METHODS FOR VALUE EXTRACTION AND GUIDED REVIEW

CROSS-REFERENCE TO RELATED APPLICATIONS

This application claims the benefit of U.S. Provisional Patent Application No. 63/268,686 filed Feb. 28, 2022, which is incorporated herein by reference in its entirety.

BACKGROUND

The comparison of documents is a time consuming and computer intensive activity. Noticing or identifying changes in documents is important in a variety of contexts. Industries interested in document comparison include, but are not limited to legal, publishing, banking, insurance, or other industries. Additionally, computer processing techniques may be limited and require human assistance to increase accuracy and speed.

BRIEF SUMMARY

In one embodiment, a method of automatic extraction of values includes scanning a document and linking a first word of a plurality of words in the document, to each word of the plurality of words in the document positionally adjacent to the right, left, top, bottom of the first word. The method further includes repeating said scanning and linking for every word of the plurality of words in the document. The method further includes determining the x and y coordinate in the document for each of the plurality of words. The method further includes providing a plurality of checklist words corresponding to information of interest. The method further includes searching the plurality of words in the document for each of the plurality of checklist words. The method further includes for each checklist word found in the plurality of words of the documents determining if a linked positionally adjacent words to the right, left, top, bottom is a value that matches typical values for the plurality of checklist words and if so, extract said value. The method further includes directing a user interface to position in the document related to content of interest related to at least one of the plurality of checklist words. In one alternative, the method includes creating a bounding box for each word of the plurality of words. In another alternative, the method further includes extracting y coordinates of the bounding boxes for each word of the plurality of words. In another alternative, the method further includes determining what words of the plurality of words are on the same y-axis using a distance formula and creating a line for each set of words of the plurality of words that are on the same line, creating a plurality of lines. In another alternative, the method further includes converting the plurality of lines to lower case. In another alternative, the method further includes stripping special characters from the plurality of lines. In another alternative, the method further includes comprising: alphabetizing the plurality of lines. In another alternative, the method further includes determining how similar each of the plurality of checklist words is to the plurality of lines to perform the searching the plurality of words in the document for each of the plurality of checklist words. In another alternative, the Jaro Winkler Distance and Dice Coefficient algorithms are used in the determining how similar each of the plurality of checklist words is to the plurality of lines.

In one embodiment, a system for automatic extraction of values includes a module executing instructions fixed in a non-transitory digital storage medium to scan a document and link a first word of a plurality of words in the document, to each word of the plurality of words in the document positionally adjacent to the right, left, top, bottom of the first word. The module further repeats said scanning and linking for every word of the plurality of words in the document. The module further determines the x and y coordinate in the document for each of the plurality of words. The module further provides a plurality of checklist words corresponding to information of interest. The module further searches the plurality of words in the document for each of the plurality of checklist words. The module further, for each checklist word found in the plurality of words of the documents, determines if a linked positionally adjacent words to the right, left, top, bottom is a value that matches typical values for the plurality of checklist words and if so, extract said value. The module further directs a user interface to position in the document related to content of interest related to at least one of the plurality of checklist words. Alternatively, the module further creates a bounding box for each word of the plurality of words. In one alternative, the module further extracts y coordinates of the bounding boxes for each word of the plurality of words. In another alternative, the module further determines what words of the plurality of words are on the same y-axis using a distance formula and creating a line for each set of words of the plurality of words that are on the same line, creating a plurality of lines. In another alternative, the module further converts the plurality of lines to lower case. In another alternative, the module further strips special characters from the plurality of lines. In another alternative, the module further alphabetizes the plurality of lines. In another alternative, the module further determines how similar each of the plurality of checklist words is to the plurality of lines to perform the searching the plurality of words in the document for each of the plurality of checklist words. In another alternative, the Jaro Winkler Distance and Dice Coefficient algorithms are used in the determining how similar each of the plurality of checklist words is to the plurality of lines. In another alternative, the words are tokenized In one embodiment, a non-transitory digital storage medium having a computer program stored thereon to perform a method for transforming and improving the processing of information and records data related documents, includes scanning a document and linking a first word of a plurality of words in the document, to each word of the plurality of words in the document positionally adjacent to the right, left, top, bottom of the first word. The method further includes repeating said scanning and linking for every word of the plurality of words in the document. The method further includes determining the x and y coordinate in the document for each of the plurality of words. The method further includes providing a plurality of checklist words corresponding to information of interest. The method further includes searching the plurality of words in the document for each of the plurality of checklist words. The method further includes for each checklist word found in the plurality of words of the documents determining if a linked positionally adjacent words to the right, left, top, bottom is a value that matches typical values for the plurality of checklist words and if so, extract said value. The method further includes directing a user interface to position in the document related to content of interest related to at least one of the plurality of checklist words.

BRIEF DESCRIPTION OF THE FIGURES

FIG. 18 shows an interface for selecting forms for renewal;

FIG. 19 shows the highlighting of forms;

FIG. 22A and FIG. 22B shows a form verification page where the user may verify whether the form pairs match with the relevant form matching information displayed;

FIG. 24 shows one embodiment of an interface for review of unique forms;

FIG. 26 shows an embodiment of form matching verification;

FIG. 27 shows the selection of mismatched forms;

FIG. 29 shows an interface whether the user may highlight forms;

FIG. 30 shows automatic navigation to the next document pages to capture any additional renewal document screen shots;

FIG. 34 shows an example of a blacked form for analysis based on form shape.

DETAILED DESCRIPTION

Figure 1:
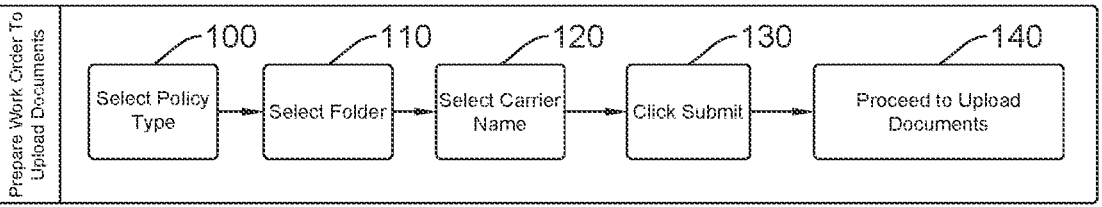
FIG. 1 shows one embodiments of an upload configuration procedure for documents for use with a Value Extraction and Guided Review (VEGR)

Certain terminology is used herein for convenience only and is not to be taken as a limitation on the embodiments of the systems and methods of Value Extraction and Guided Review ("VEGR"). In some embodiments, VEGR provides for a text extract and guided view via a search enhancing metadata imbued list. In some embodiments, VEGR provides for the comparison of an original document (at times referred to as original document or original or form) with a document selected for comparison (at times referred to as a comparison document). In many embodiments, the comparison of documents and the function of the system is optimized via providing a search enhancing metadata imbued list. In many embodiments, the comparison of documents includes for checklist words of the search enhancing metadata imbued list found in the comparison document determining if a linked positionally adjacent words to the right, left, top, bottom is a value that matches typical values for the plurality of checklist words and if so, extract said value. The search enhancing metadata imbued list is created in the original document for usage as a template of sorts, whereby the characters of interest are identified and their expected x-y and page position locations and in some cases additional meta data. Additionally, not only does VEGR provide the user matches, but it also efficiently guides the user using the search enhancing metadata imbued list to the matches and specific locations in the documents where the matches are located, such that processing speed of a VEGR system is improved as well as review by the user.

In many embodiments, VEGR improves the processing time and efficiency of a computing device, such as a general-purpose computer executing code for a specific function. Therefore, this specific purpose machine can improve processing time and efficiency by executing embodiments of VEGR. More specifically, text searching for particular information in a document is relatively well known, however, this type of technique does not typically reveal or identify meaningful information quickly enough. This is especially true when comparing two documents. In order to expedite the comparison of two documents and provide for the extraction of relevant values, additional techniques may be utilized. A first step of comparing documents, includes comparing words or characters of a document. This involves comparing the characters in each position in one document to the characters in the same position in another document. Additionally, when a word representing characters of interest is found, adjacent areas are searched, based on x-y position (up, down, left, right) that may include a relevant value of interest, based on values that typically occur, for extraction. This type of processing can be time intensive and greatly reduce the efficiency of the review. Additionally, the user may be overloaded with differences in the two documents. Alternatively, the comparison may be based on characters in a certain x-y position on a certain page of a document. Similarly, such a comparison methodology may have advantages in some respects, but still may resulting in too many points of comparison and to get an increasing in processing time. Instead, techniques may include the use of bounding boxes and target tokens and additionally bounding box positions.

Therefore, a search enhancing metadata imbued list including a list of target words is provided to an embodiment of VEGR. The VEGR system receives two documents, an original document, and a comparison document. VEGR compares the original document and the comparison document. In many embodiments a typical OCR process is used (Optical Character Recognition). In many configurations, the documents are pdfs, but a variety of different document types may be used. VEGR does not compare all aspects of the original and comparison document. Instead, in one configuration VEGR works from a search enhancing metadata imbued list of interest. In one embodiment, VEGR presents to a user, matched content of interest from a search enhancing metadata imbued list. Additionally, when the content of interest is found, value extraction may occur. The value is extracted based on when a word representing characters of interest is found, adjacent areas are searched, based on x-y position (up, down, left, right) that may include a relevant value of interest, based on values that typically occur, for extraction. For instance, if the cost of an item was searched for, based on text strings, when the text strings are found a number would be searched for above, below, to the left of, and to the right of the matched term. VEGR searches the original document for text matching those of the search enhancing metadata imbued list. Subsequently, the comparison document is searched for text matching those of list of interest. Then matches are compared and presented to the user for confirmation. In an alternative, the position of text matching those of a search enhancing metadata imbued list is additionally considered. In this alternative, a text corresponding to the search enhancing metadata imbued list is identified. Additionally, the position of this text is recorded. In comparison of the original document and the comparison document, the position and the characters are matched, and then presented to the user. In additional alternatives, each item on the search enhancing metadata imbued list is defined by a bounding box. The positions and size of the bounding boxes is taken into consideration in the comparison. In additional alternatives, based on the identification of bounding boxes for text matching those of a search enhancing metadata imbued list are identified in an original document and a comparison document and presented to the user for review and confirmation of their match. In many embodiments, in addition to the text of the search enhancing metadata imbued list and the bounding box matching, their may be a potential variable value associated with the search enhancing metadata imbued list and bounding box. In other words, a portion of the text of the search enhancing metadata imbued list may be used to identify the location of an item of interest and the bounding box may extend beyond the test of the search enhancing metadata imbued list to capture a variable value that is associated with the search enhancing metadata imbued list. In such a scenario, the user may confirm that the search found the proper position and identifier as well as checking to see if the variable value modified.

Additionally, in some embodiments VEGR includes the definition of forms by the user, for use in checking multiple comparison documents, which may be similar to an original document. The similarity may include similar bounding boxes and items to compare from a search enhancing metadata imbued list and have the potential for variable values associated with each bounding box. In such a scenario, a user may review an original document in order to create a form to review comparison documents with. In the creation of a form for an original document, VEGR may assist with the location of items from a search enhancing metadata imbued list by text searching and bounding boxes. When the user is presented with a correct identification of the location of a bounding box in the original document, the user may indicate to VEGR that this bounding box position and associated text corresponds to an item from the search enhancing metadata imbued list. Once ever item on the search enhancing metadata imbued list is complete, the VEGR may efficiently review comparison documents. In this operation, VEGR efficiently reviews a comparison document based on the form created for original document. The user is presented the entry in the comparison document corresponding to each item from the search enhancing metadata imbued list. Each item from the search enhancing metadata imbued list is identified based on text and position in the comparison document. In many configurations, the text identifiers may be a phrase. In such a scenario, the phrase may be tokenized or otherwise broken down into subcomponents.

In one embodiment, VEGR may be deployed for policy checking. This is typically in the context of insurance policies for various uses. In such a scenario, a customer may review insurance policies on a periodic basis. However, the offerings of the companies may change over time, such that the customer may not be sure whether the policy is comparable or not. Accordingly, policy checking may be desirable, but tedious, and in mass computationally significant in terms of computing time and manual review hours. Therefore, VEGR may reduce processing time and increase efficiency of analysis of policies and provide reviews with streamlined and efficient review of policies, whereby their review is specifically guided.

Figure 2:
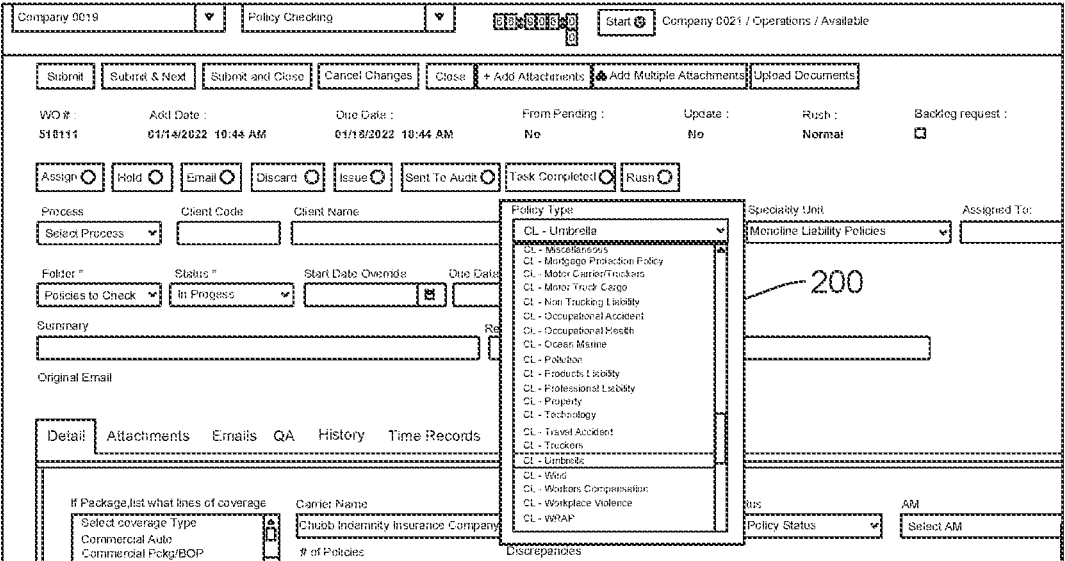
FIG. 2 shows a user interface, whereby the user may select a policy type.
Figures 3, 4:
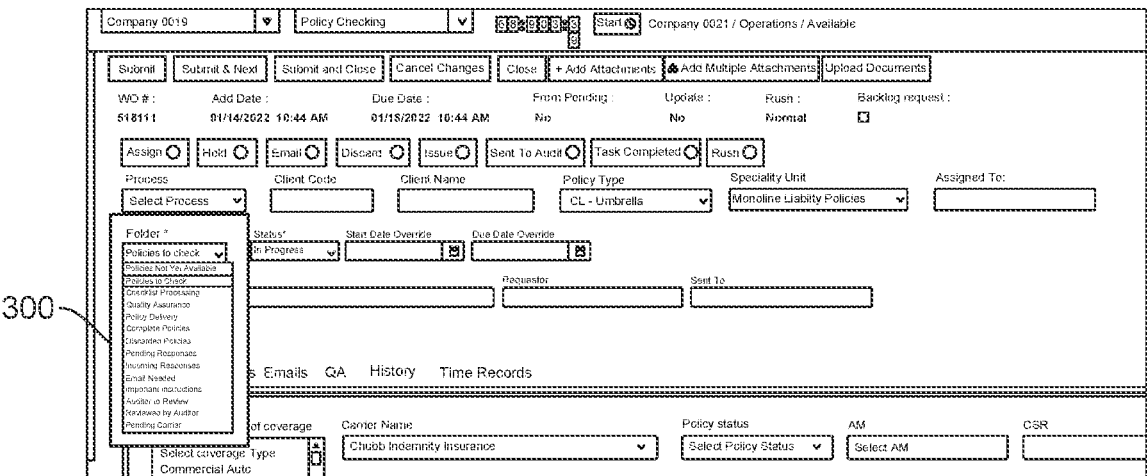
FIG. 3 shows a user interface, whereby the user may select a subset of policy folders.
FIG. 4 shows a user interface, whereby the user may select a subset of carrier names.

FIG. 1 shows one embodiments of an upload configuration procedure for documents for use with VEGR. Using VEGR a user may prepare to upload documents for review. In step 100, the user may select from a variety of policy types. In step 110, the user selects a subfolder of policies. In step 120, the user selects the policy carrier name. In step 130 the user clicks to submit. In step 140 the user activates the upload of documents. Here, as briefly discussed above, there may be various preset forms created according to a particular policy provider. By selecting the correct provider, the preset forms already have bounding box information and other indicators as to where items of interest are located in policy documents, such that they can be identified and compared under the original/comparison policy paradigm. FIG. 2 shows a user interface, whereby the user may select a policy type from a drop down 200. This is one of the many possible interfaces. FIG. 3 shows a user interface, whereby the user may select a subset of policy folders from a drop down 300. This is one of the many possible interfaces. FIG. 4 shows a user interface, whereby the user may select a subset of carrier names from a drop down 400. This is one of the many possible interfaces.

Figure 5:
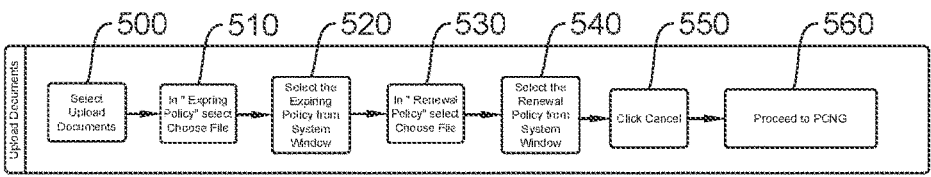
FIG. 5 shows one embodiment of another upload procedure.

FIG. 5 shows one embodiment of another upload procedure. Once documents are configured to be uploaded against the correct policy forms/templates, uploading may commence. In step 500, the user selects the documents for upload. In step 510, the user chooses the expiring policy. In the context of previous descriptions, the expiring policy becomes the original document for comparison. In step 520, the user chooses the file. In step 530, the user chooses the renewal policy. In step 540, the user chooses the file. In step 550, the user may cancel selections and start over if there is a mistake. Then in step 560 the user proceeds to the policy checker.

Figure 6:
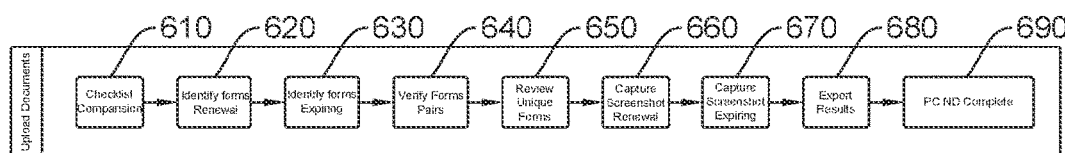
FIG. 6 shows a flow chart for the PCNG (policy checking next generation) process.

FIG. 6 shows a flow chart for the PCNG process. In step 610, a checklist comparison is conducted. This involves confirming PCNG identified checklist items are identified properly in the PDF and confirming the checklist items if they match the AMS. Step 620 includes identifying the form renewal by confirming that all Renewal Forms pages have been identified and (as necessary) highlighting any missing forms). Step 630 includes a process to identify expiring forms and provides that all Expiring Forms pages have been identified and (as necessary) highlighting any missing forms). In step 640, the verifies form pairs, including that all of the forms that PC NG has successfully matched are truly matches. In step 650, the user reviews unique forms, including a review of forms that may be unique, or that PC NG has not successfully identified. The user in this step may classify the form as a match, or unique. In step 660 the user may execute a capture screenshot renewal in that the user may capture screenshots of the renewal PDF forms pages with pre-color-coded unique documents indicated. In step 670 the user may execute a capture screenshot of an expiring policy in that the user may capture screenshots of the renewal PDF forms pages with pre-color-coded unique documents indicated. In step 680 the user may export results, which includes exporting the above steps to the USI policy checking spreadsheet—all of the above-classified data and screenshots will export to the spreadsheet.

Figure 7:
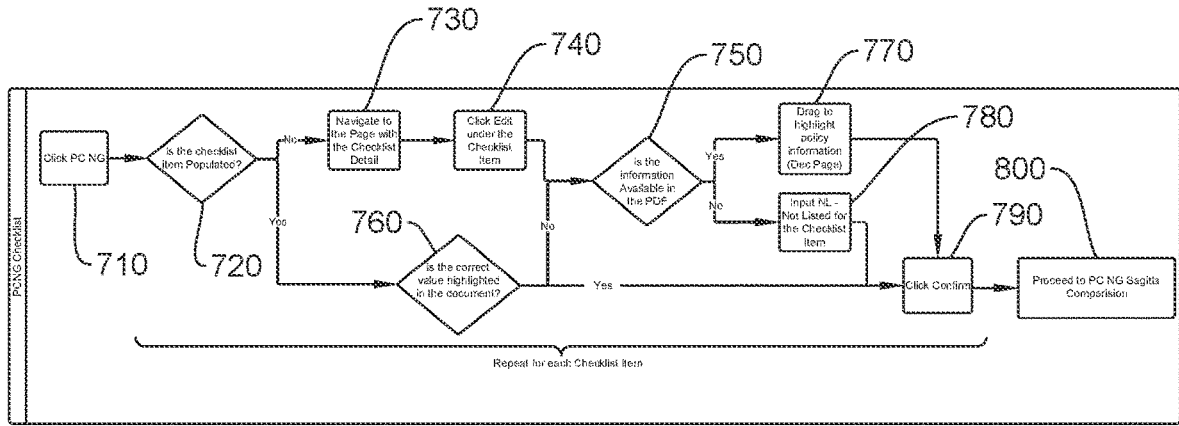
FIG. 7 shows a flow chart for checklist comparison using an embodiment of a VEGR system.

FIG. 7 shows a flow chart for checklist comparison using an embodiment of a VEGR system. (Also referred to as Policy Checking Next Generation (PCNG) when used in relation to policy checking). First in step 710, the user activates the process, typically by clicking on the application or other activation button. In step 720, the system checks to determine if the checklist is populated. If not, the user navigates to the checklist detail page. The user may then edit the checklist in step 730. In step 760, the user is presented with highlighted values to confirm match in the documents. In step 750, it is determined whether relevant information to the policy check objective is present. In step 770, the user drags to highlight policy information. In step 780, if the information is not available, then this is indicated in the checklist. Once all items are complete, the user click confirm in step 790 and then proceeds to Sagitta Comparison in step 800.

Figure 8:
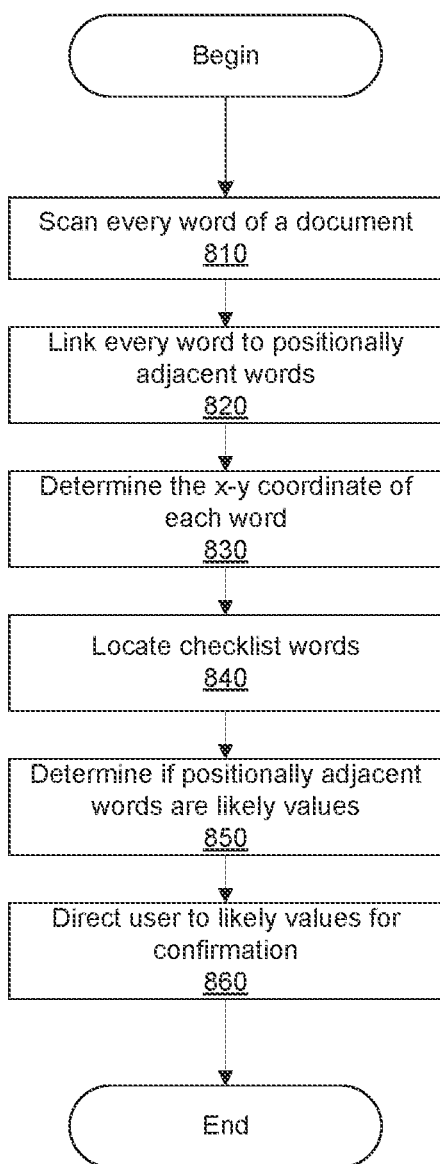
FIG. 8 shows a flow chart for the creation of matches for display.

In this context, it is important to note the process of preparing highlighted values for the user to compare. FIG. 8 shows a flow chart of how VEGR recovers values for confirmation by the user. In step 810 every word of the document of interest is scanned. Then, a new structure is created in linking every word to every positionally adjacent word in step 820. This linking provides a data structure providing for a more streamlined searching. As part of this process the position of each word is determined in step 830. Subsequently, checklist words are located in step 840. Then, the positionally adjacent words are checked in step 850. If the words are likely to be values of interest, then the word is determined to be a value of interest and in step 860 the user is directed to the word via checklist review to confirm it was the value being searched for.

Figure 9:
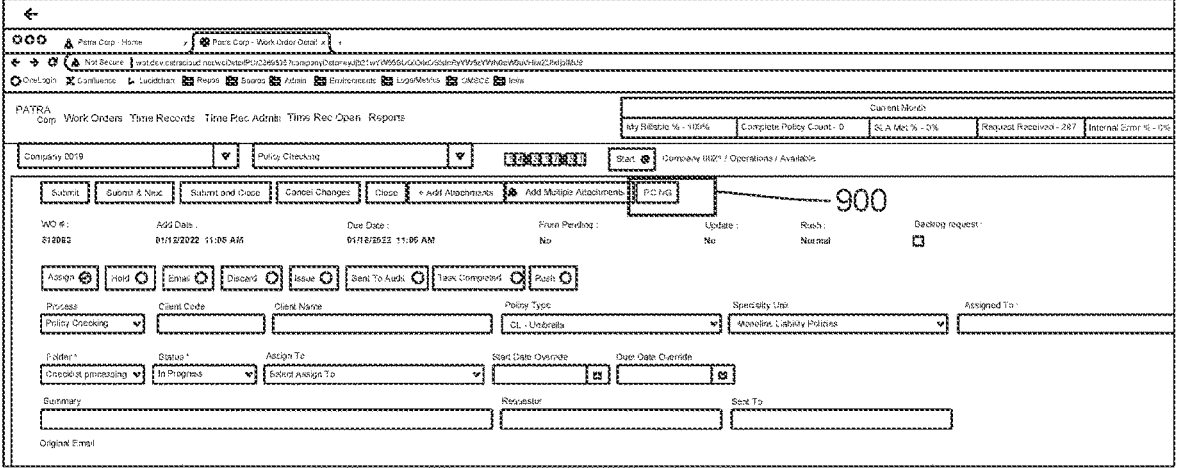
FIG. 9 shows one embodiment of an interface for a version of VEGR.
Figure 10:
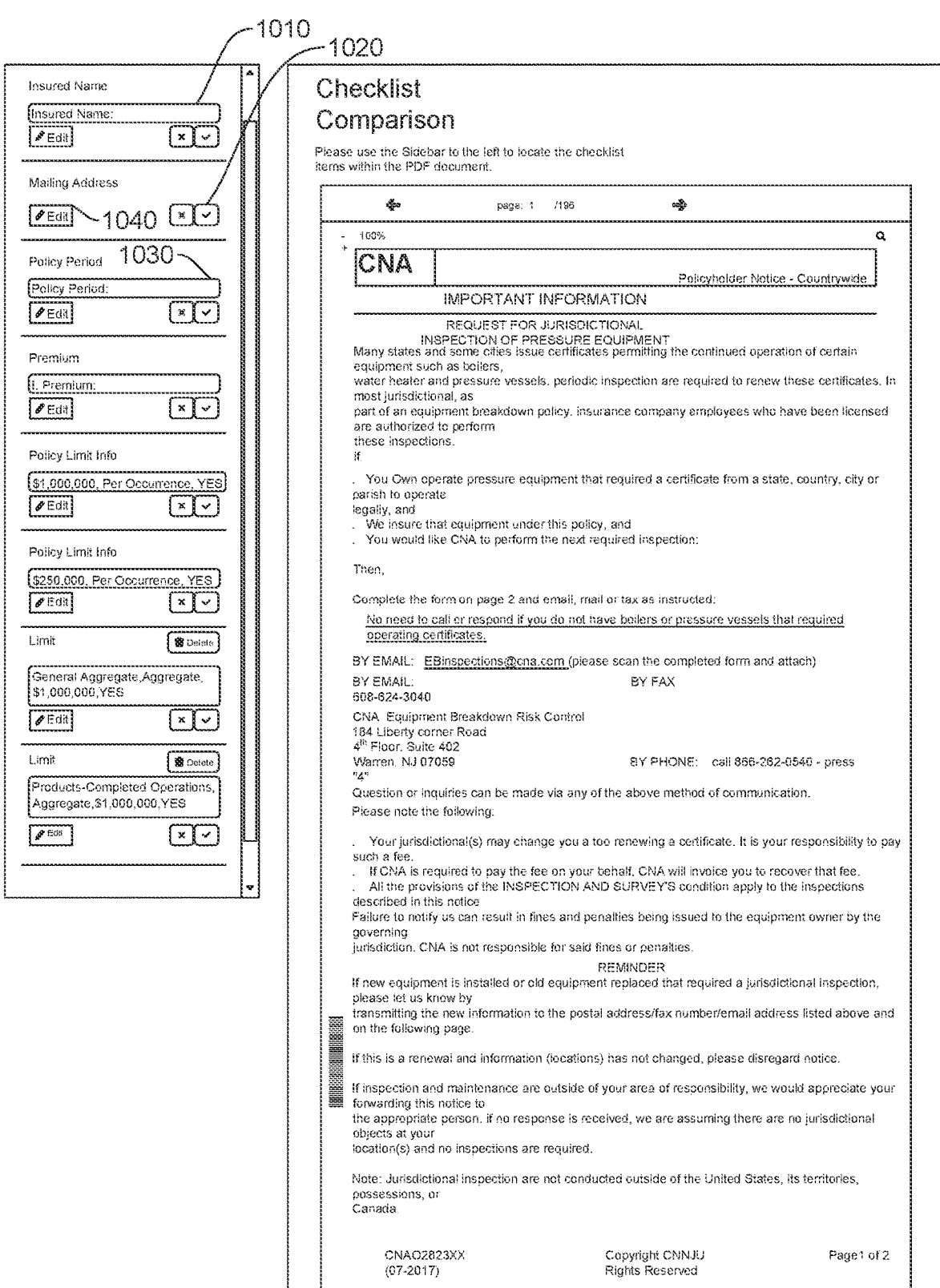
FIG. 10 shows an embodiment of a checklist comparison screen.
Figure 11:
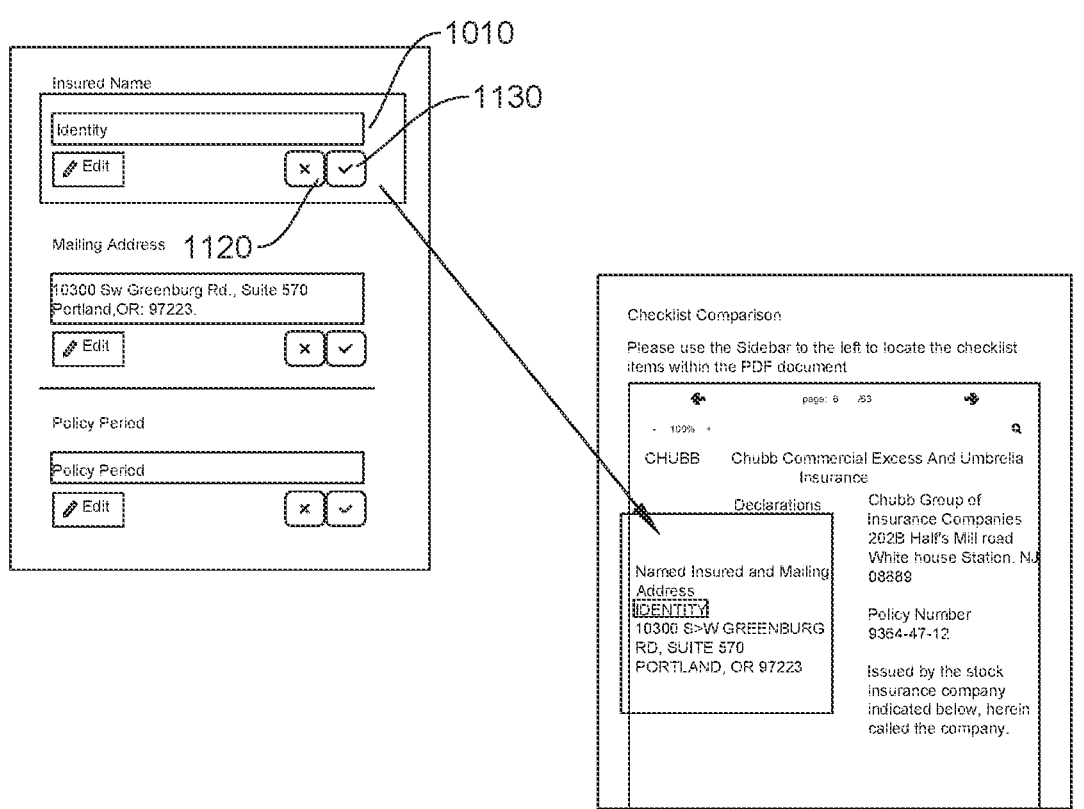
FIG. 11 shows another view of the checklist comparison screen in operation.

FIG. 9 shows one embodiment of an interface for a version of VEGR. When PC NG has processed the documents and the PE opens the subject work order, the PC NG button 900 appears in the header buttons of the work order screen. FIG. 10 shows an embodiment of a checklist comparison screen. In this screen, a variety of check list items such as insured name 1010, mailing address 1020, and policy period 1030 are shown. Many other options are possible for these checklist items. In some occurrences, certain fields may not be filed and may be blank. This is because the VEGR system failed to match a particular list item according to the identification algorithm of the system. In such a scenario, the user may manually find the entry of interest and use the edit button to bound a box around that area. FIG. 11 shows another view of the checklist comparison screen in operation. In this view, checklist item 1010 is selected by the user. The document automatically jumps to the relevant portion 1110 and highlights the material corresponding to this entry. Using the check boxes, 1120, 1130 the user may confirm the entry. Subsequently, the user may cancel, confirm, or reset the fields. Additionally, in many configurations the user may add additional items to the checklist. This is especially true in cases of various policy limits, but it may generically be used.

Figure 12:
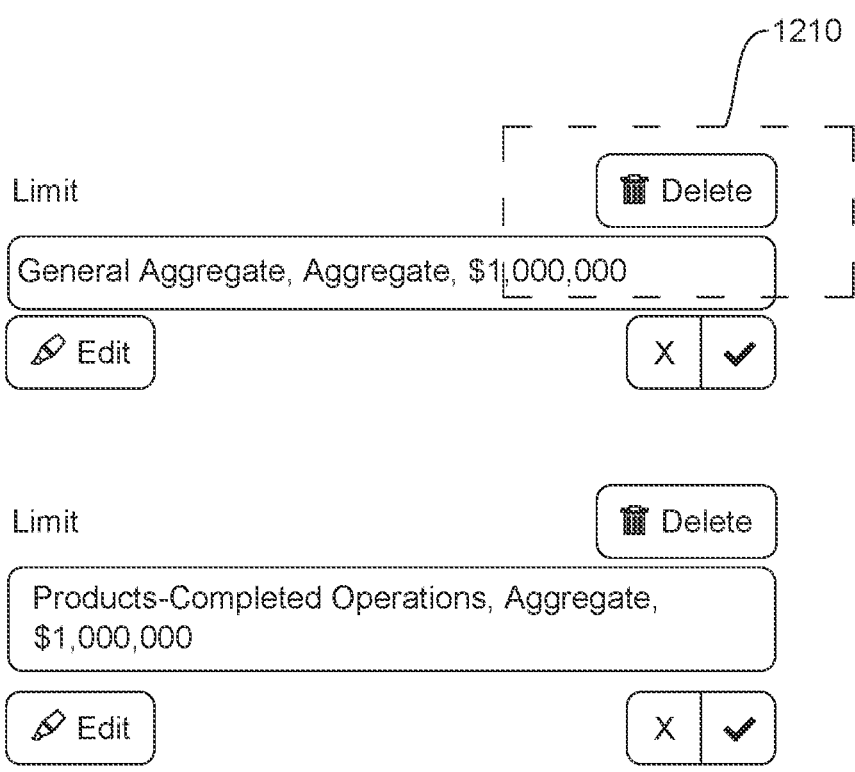
FIG. 12 shows how in some configurations a delete button may be included for various list items.
Figure 13:
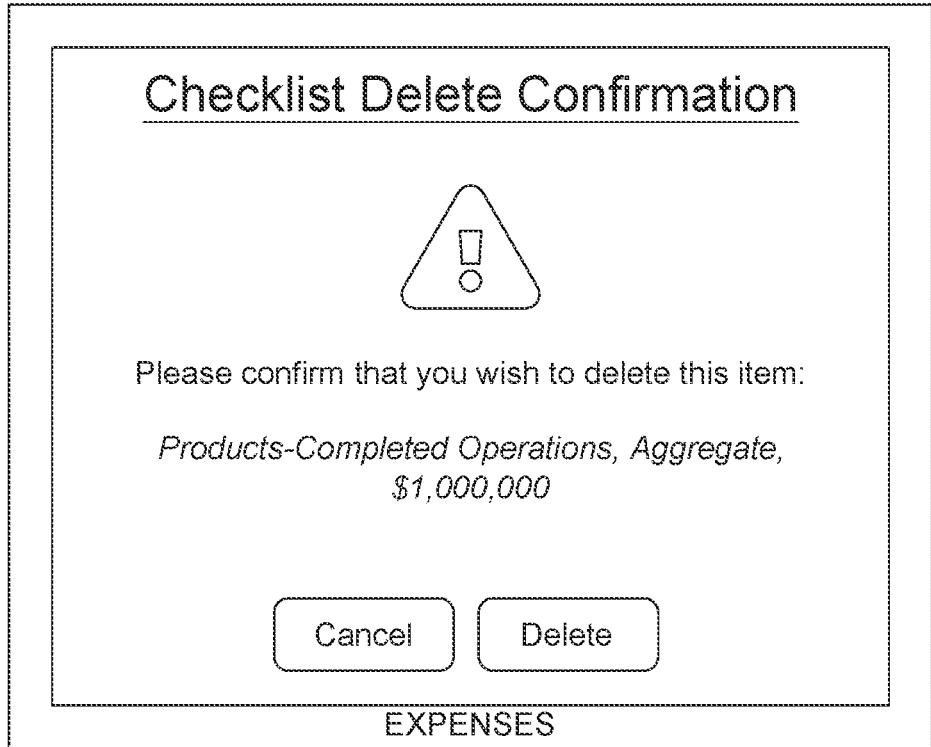
FIG. 13 shows a delete confirmation warning screen.
Figure 14:
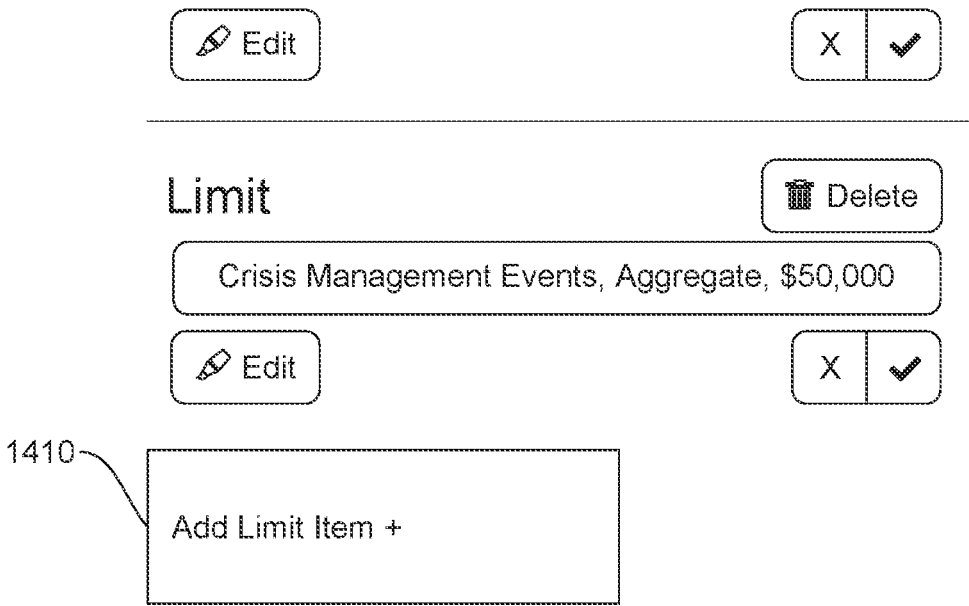
FIG. 14 shows the add limit button.
Figure 15:
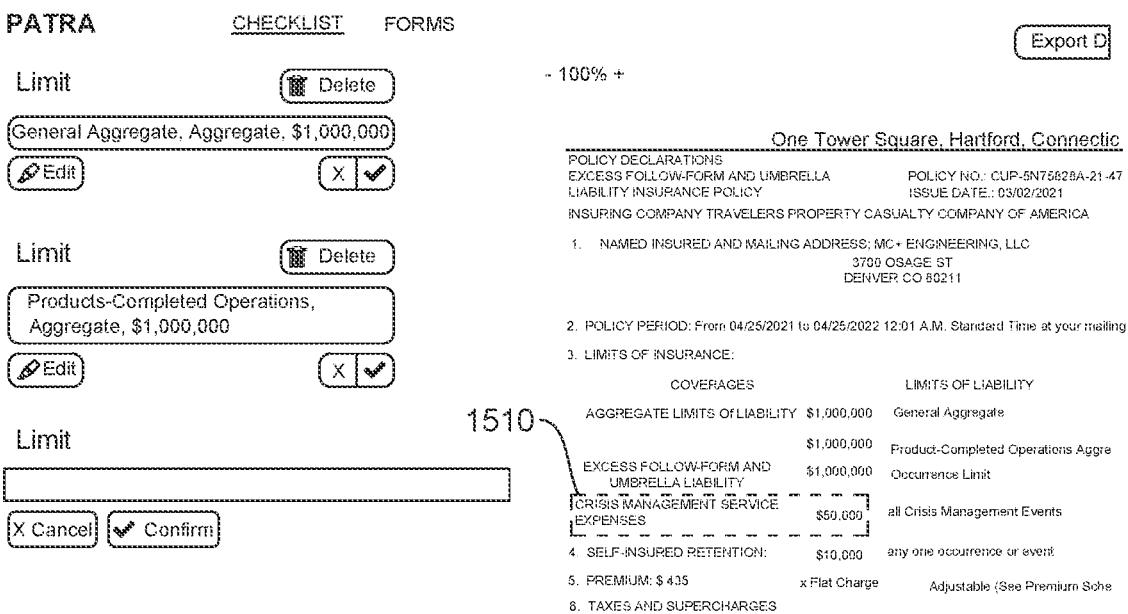
FIG. 15 shows how the user may create a bounding box.
Figure 16:
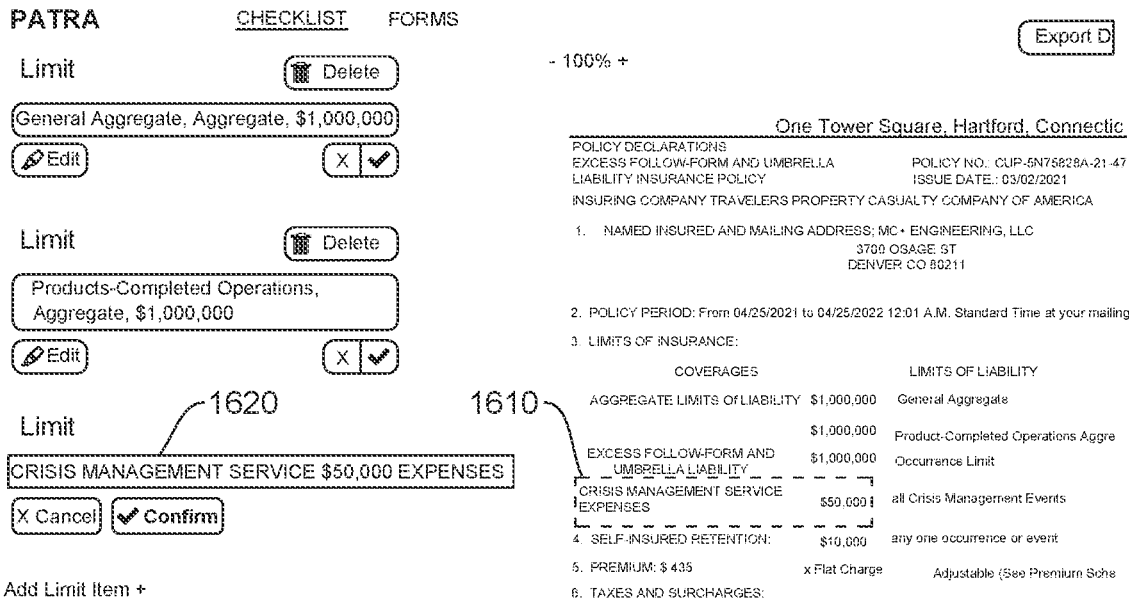
FIG. 16 shows how the value in box is automatically populated.

FIG. 12 shows how in some configurations a delete button 1310 may be included for various list items. FIG. 13 shows a delete confirmation warning screen. FIG. 14 shows the add limit button 1410. An add button may be included generically or for certain categories. The add limit button 1410 allows the user to add an additional limit and drag to highlight a box for the limit. FIG. 15 shows how the user may create a bounding box 1510 for the new checklist item. FIG. 16 shows how the value in box 1610 is automatically populated in area 1620.

Figure 17:
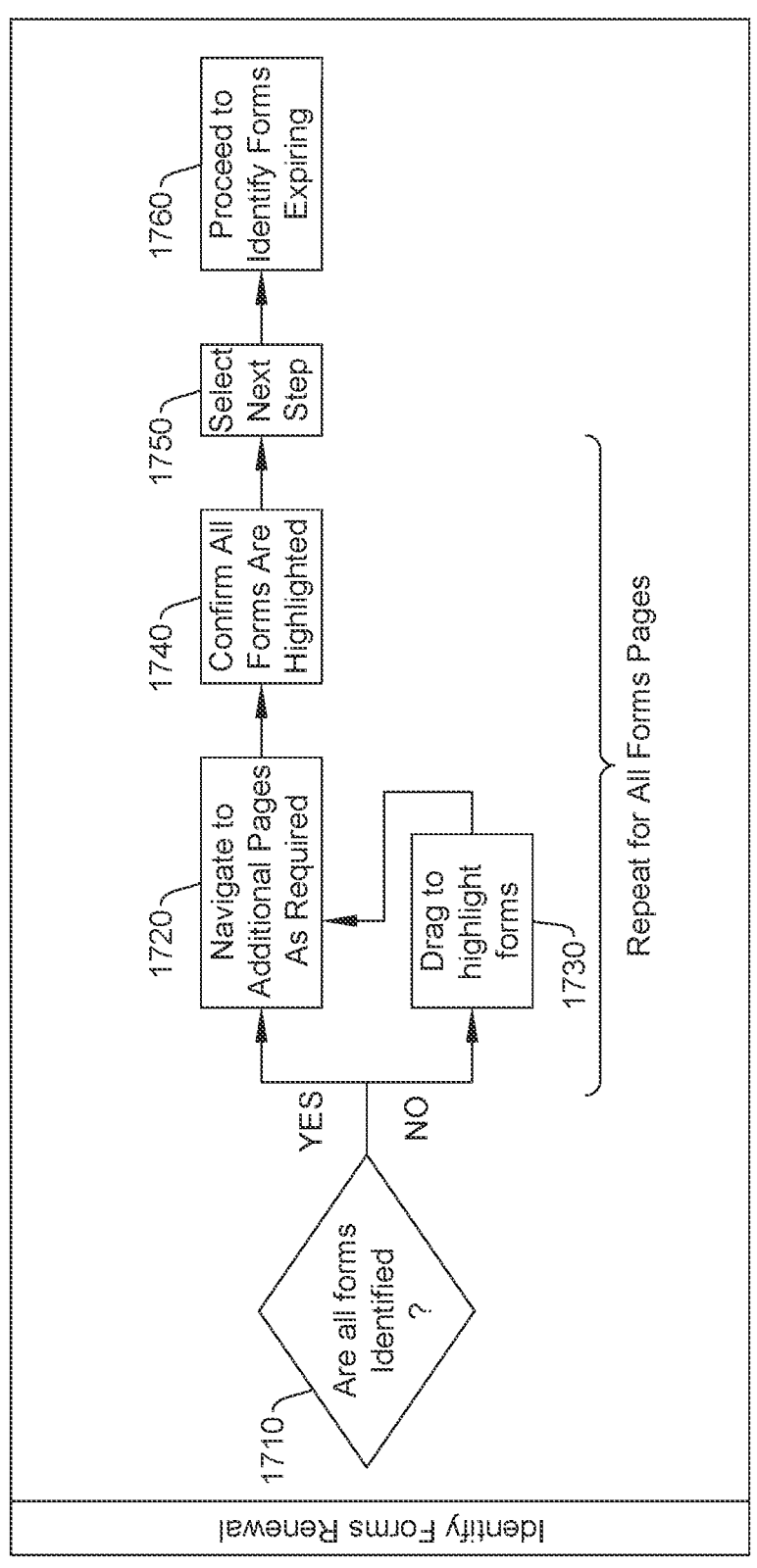
FIG. 17 shows a flowchart for one embodiment of a method of identity form renewal.

FIG. 17 shows a flowchart for one embodiment of a method of identity form renewal. In step 1710, it is determined whether all forms are identified. If not, in step 1730 the user may drag to highlight forms that are not identified. In step 1720 the user may navigate to additional pages as needed. In step 1740, the user confirms that all forms are highlighted. In step 1750, the user selects to proceed to the next step in step 1760. Step 1760 proceeds to identify expiring forms. As shown in FIG. 18, the user may select forms 1810 for renewal by highlighting 1820 them. Although here all forms are shown as highlighted (typically in yellow), the user may choose to not select all forms. Once the user identifies the forms and proceeds, the forms will be highlighted 1910 (typically in red), as shown in FIG. 19.

Figure 20:
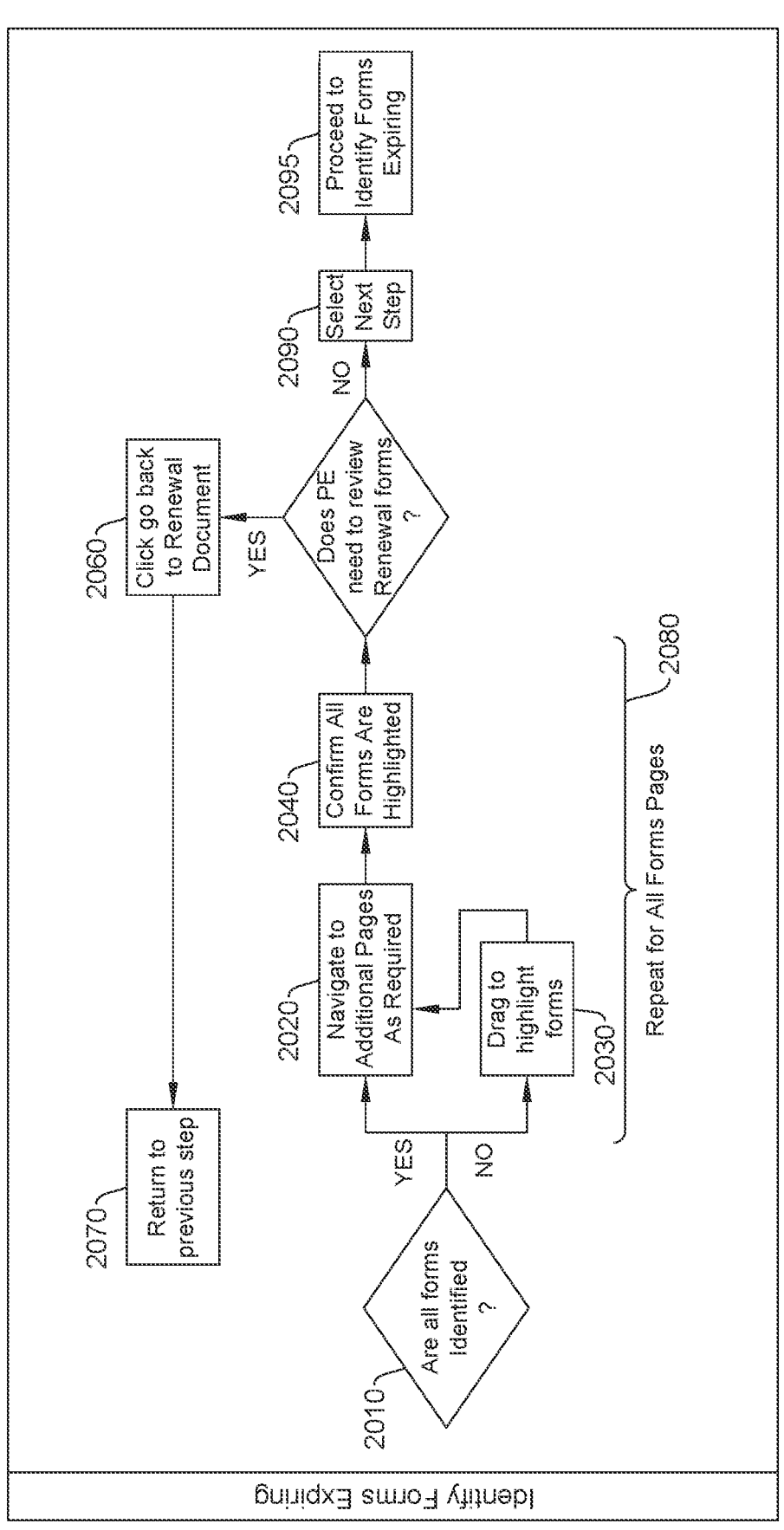
FIG. 20 shows how expiring forms may be identified.

Additionally, as shown in FIG. 20, the user may identify expiring forms. In step 2010 it is determined whether all forms are identified. If yes, then the user moves to step 2020 where the user may navigate to additional pages as required. If not, then the user may select the forms in step 2030 by highlighting them. In step 2040, the user confirms that all forms are highlighted. In step 2050 it is determined whether the policy review needs to review renewal forms. If yes, then the in step 2060, the user may click to go back to the renewal document. In step 2070, the user then returns to the previous stage. Steps 2020-2050 are repeated 2080 for all form pages. If no forms need to be reviewed, then in step 2090 the user proceeds to the next stage in step 2095.

Figure 21:
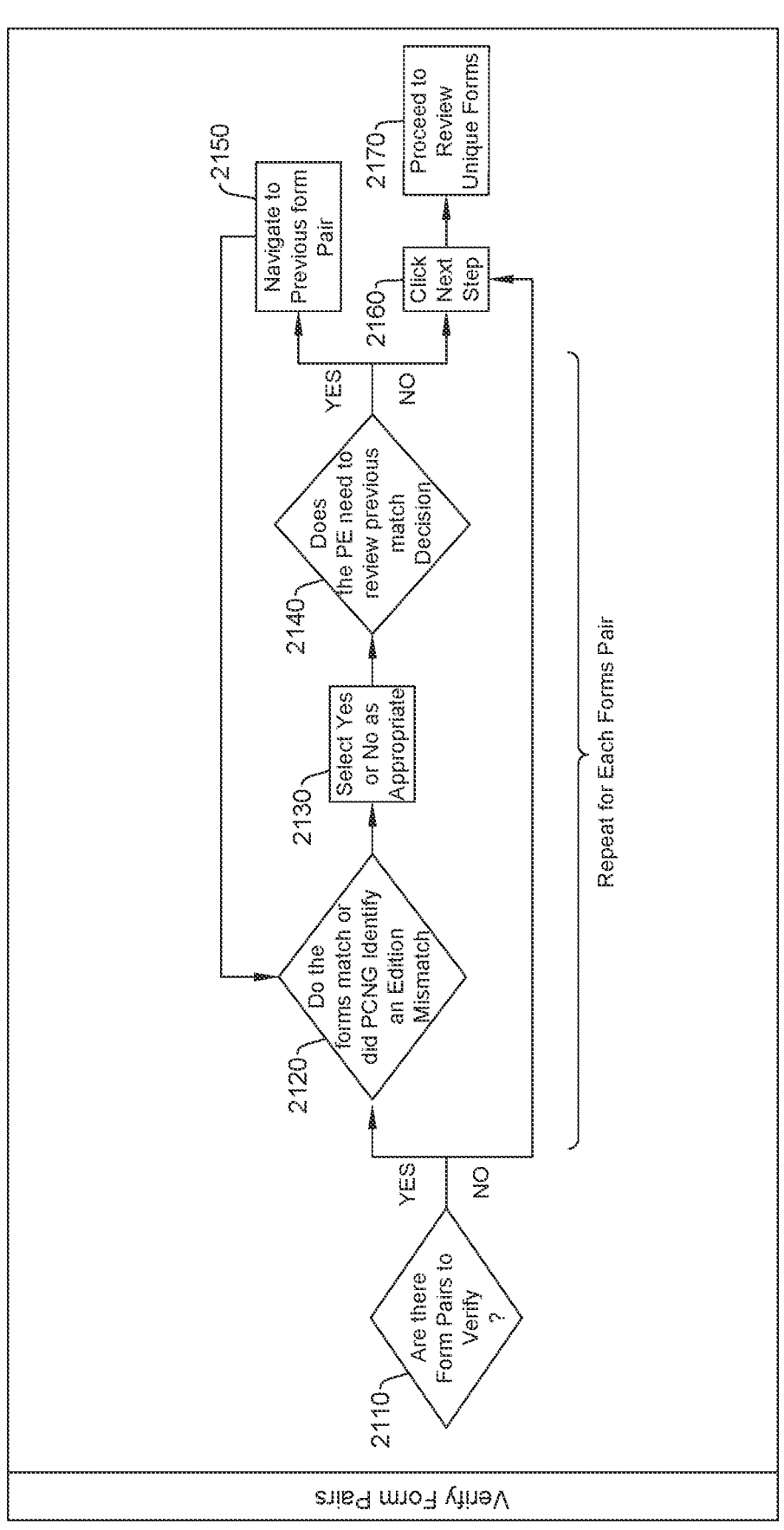
FIG. 21 shows a procedure for verifying form pairs.
Figure 23:
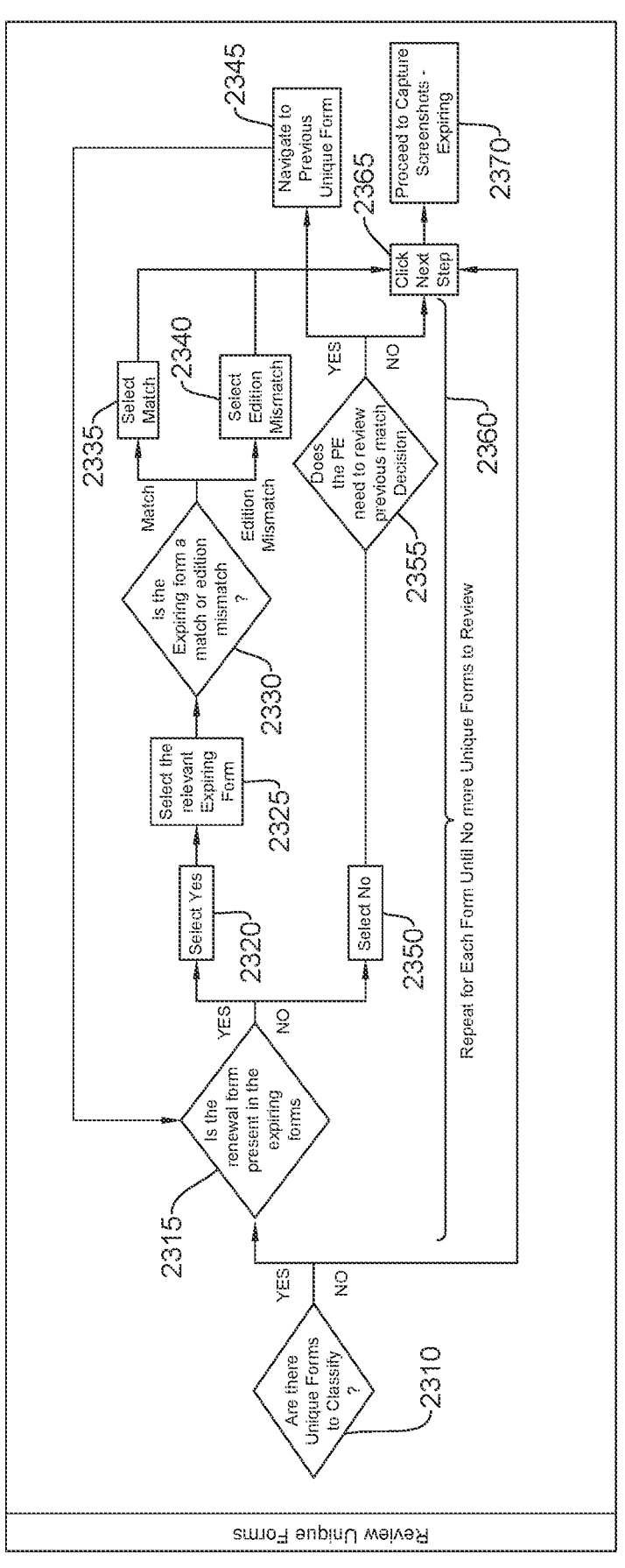
FIG. 23 shows an embodiment of a procedure for reviewing unique forms.

FIG. 21 shows a procedure for verifying form pairs. In step 2110 it is determined whether there are form pairs to verify. In step 2120 it is determined whether the forms match or if the policy evaluator determined an edition mismatch. The policy evaluator selects yes or no as appropriate. In 2140, it is determined whether the previous match decision needs to be reviewed. If yes, in step 2150, the previous form pair is navigated to. If no, then in step 2160 the user clicks next step and proceeds to step 2170 where unique forms are reviewed. FIG. 22A and FIG. 22B shows a form verification page where the user may verify whether the form pairs match with the relevant form matching information displayed. In this scenario, VEGR has determined a match is likely. FIG. 23 shows another version of the matching page where VEGR has determined a match is unlikely.

FIG. 23 shows an embodiment of a procedure for reviewing unique forms. In step 2310 it is determined whether there are unique forms to identify. In step 2315 it is determined whether form is present in the expiring forms. If yes in step 2320 the user selects yes. In step 2325 the user selects the expiring form. In step 2330 it is determined whether the expiring form is a match or a mismatch edition. If it is a match, then in 2335 the user selects that it is a match. In step 2365 the user may then navigate to the next step in step 2365. Otherwise, the user in step 2340 selects that it is mismatch and proceeds to the next step. If in step 2315, the are no renewal forms present in the expiring forms, then the user selects no is step 2350. In step 2355, it is determined whether the policy evaluator needs to review the previous match decision. If no, then the user proceeds to previous unique forms in step 2345. Otherwise, the user proceeds to the next step in step 2365. Steps 2315 through 2355 are repeated until there are no forms left to review. In step 2310 if there are no forms to review, then the process is bypassed to step 2365.

Figure 25:
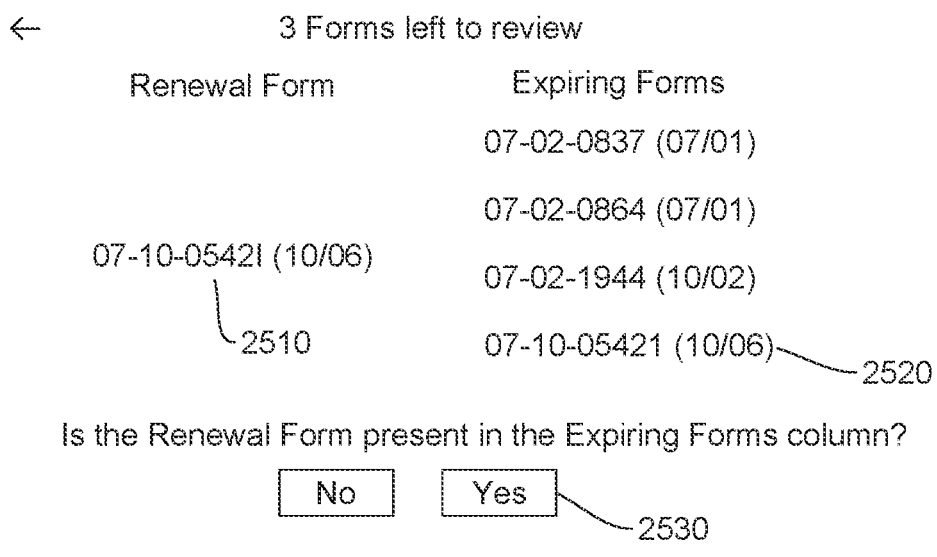
FIG. 25 shows another interface where a form match is to occur.

FIG. 24 shows one embodiment of an interface for review of unique forms. In the FIG. 24 none of the expiring forms match the renewal form. FIG. 25 shows another interface where a form match is to occur. In this case the user may manually select a match. The reason the system did not return a match is that an "I" 2510 was OCRed as a "1" 2520. If the user selects the yes button 2530 then the user will be asked to select the matching form as in FIG. 26. In FIG. 27 the user has selected the mismatched form 2710. The user is additionally requested to indicate whether it is a match 2720 or an edition mismatch 2730.

Figure 28:
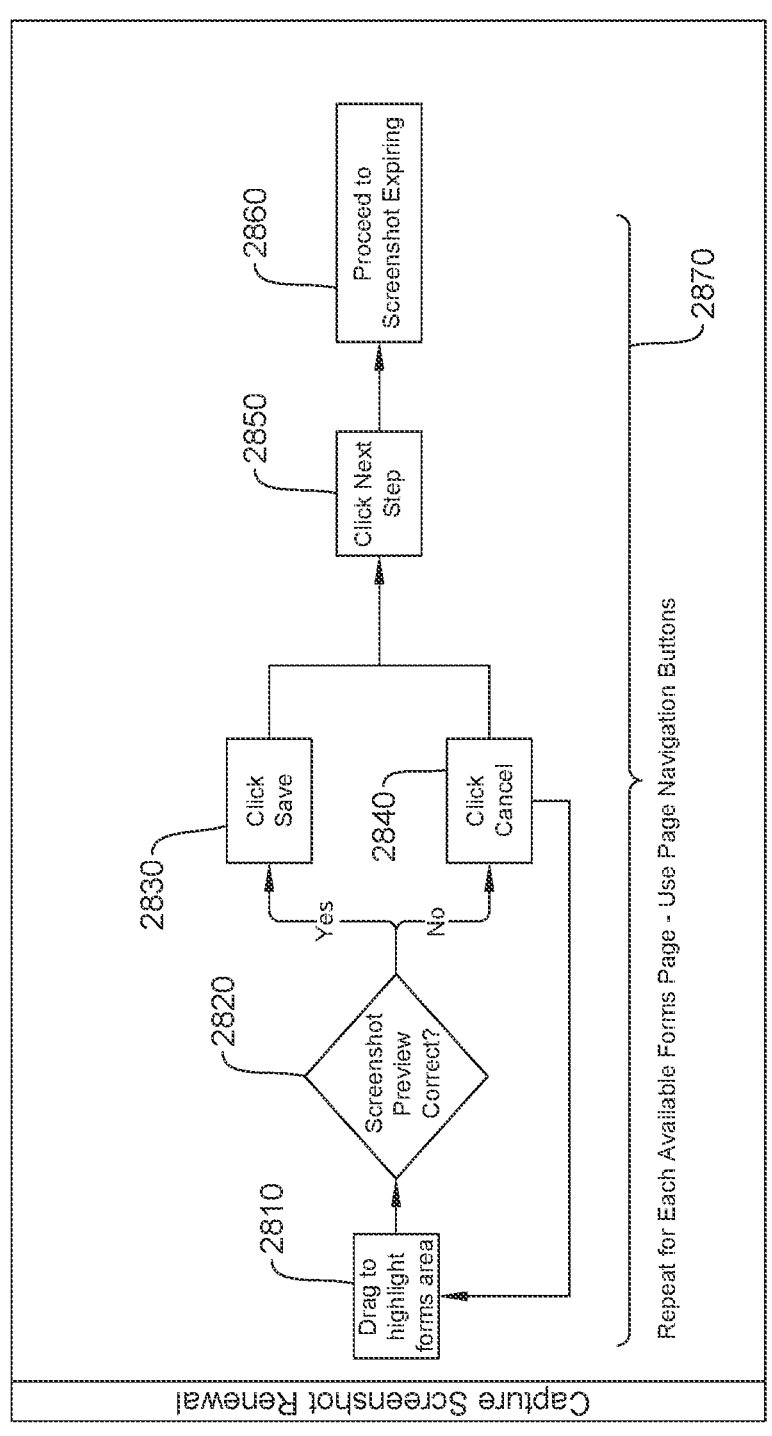
FIG. 28 shows a flow chart for capture screen shot renewal.

FIG. 28 shows a flow chart for capture screen shot renewal. First the use drags to highlight form areas in step 2810. In step 2820 the user reviews a screenshot previous and determines whether it is correct. If it is correct, in step 2830 the user clicks save. If not, in step 2840 the user clicks cancel, and another attempt is made. If the screenshot is correct, then in step 2850 the user clicks next step and proceeds to screenshot expiring in step 2860. Steps 2810-2840 are repeated 2870 for each available form page. FIG. 29 shows an interface whether the user may highlight 2910 forms. FIG. 30 shows how when a policy evaluator selects save in a modal window, the PCNG will automatically navigate to the next document pages to capture any additional renewal document screen shots. The policy review may navigate back to previous screens.

Figure 31:
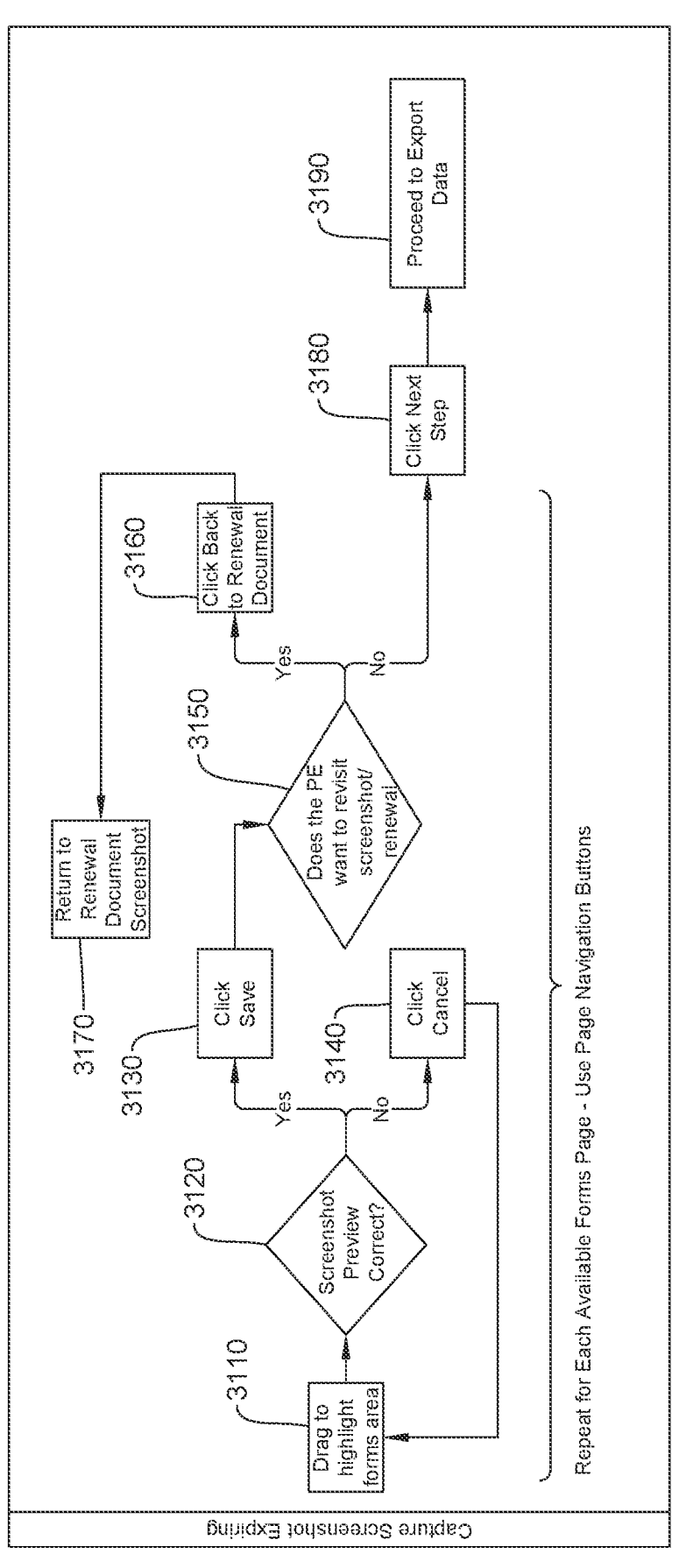
FIG. 31 shows a flow chart for capturing Screenshots that are expiring.

FIG. 31 shows a flow chart for capturing Screenshots that are expiring. In step 3110 the drags to form a highlighted area. In step 3120 it is determined whether the screen shot preview is correct. If so, in step 3130 the user clicks save. If not, the user clicks cancel in step 3140. In step 3150 if the policy evaluator wants to revisit the screen shot/renewal screen, they may click back in step 3160. Then in step 3170 the PE returns to the renewal document screen shot. If not, they may click next step in step 3180 and proceed to data export in 3190. Subsequently, the user may export data from the system according to commonly used document selection and export means. This describes a system specifically for policy checking.

Figure 32:
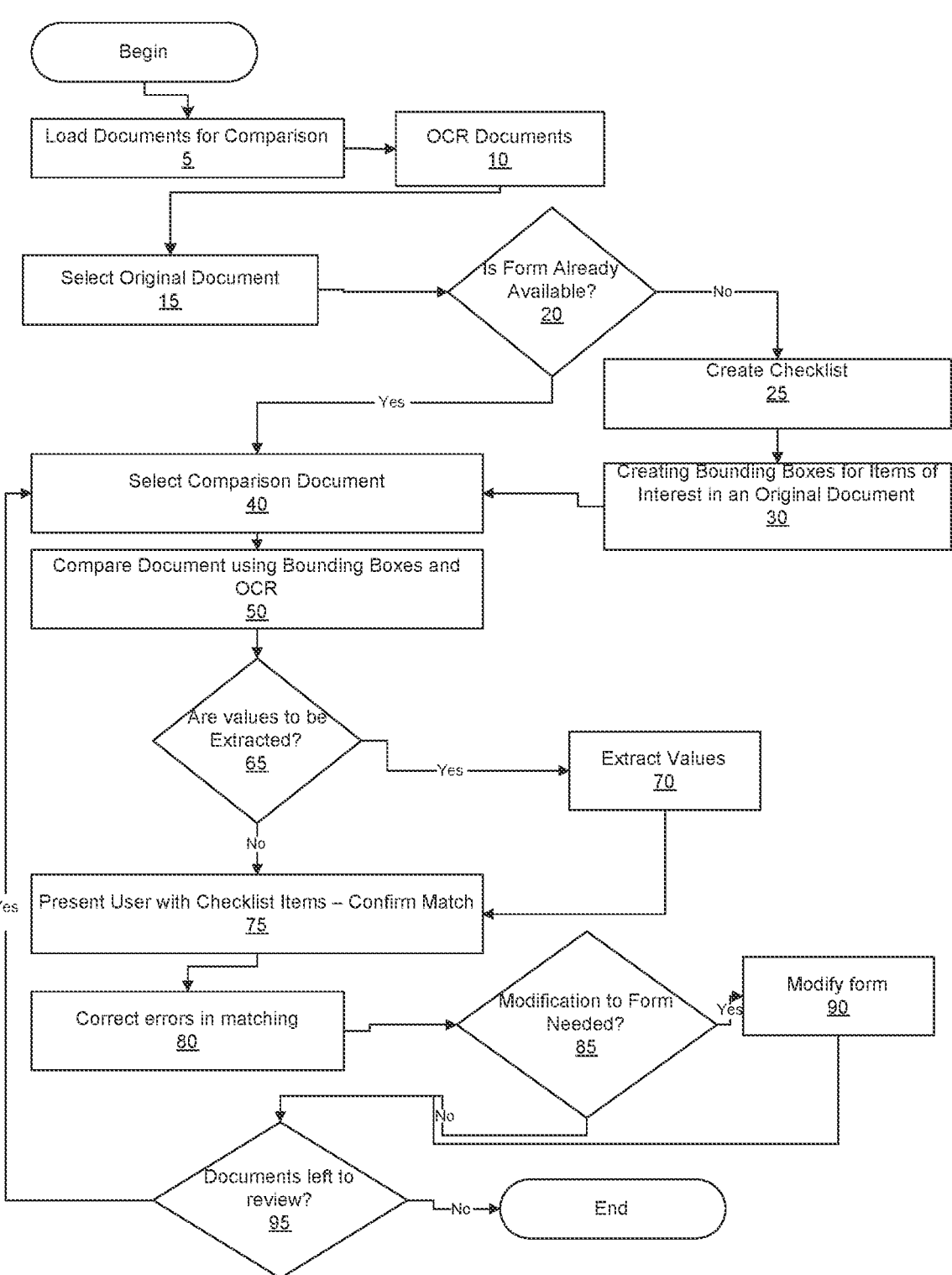
FIG. 32 shows a flow chart for another embodiment of VEGR system.

FIG. 32 shows a flow chart for another embodiment of VEGR system. This basis may be deployed in a variety of contexts and the processing speed and efficiencies in increased significantly based on the method shown. In many embodiments, the documents to be reviewed are provided in pdf format, but other formats are possible, as well as conversion to pdf. In step 5, the user loads documents for comparison. In step 10, OCR (optical character recognition) is performed. Additionally, in this step bounding boxes may be created for each letter, word, or other aspect of the document. Is step 15, an original document for comparison. This document becomes the document for comparison. In some embodiments the comparison may be based on a list of documents that refer to subdocuments that may then compared according to VEGR the same or similar positional and character match. In other words, the system may first match a list of forms and then in the case where there is matching form no checklist creation and bounding box identification is necessary. In the case of comparison of one document to another or one document to a set of documents, in step 20, it is determined if a form is already available for comparison. If a form is already available, then in step 40 a document for comparison is selected. If not, then a comparison document is created. A preset form may be selected from a list of forms in some embodiments. This first occurs by making a checklist in step 25. The checklist is the items of interest that the user is interested in comparing. This may be a preset list, a list determined by the user, or a combination of both. The list may be partial based on the list of previous form or completely based on a previous form. Then based on the checklist, text corresponding to items on the list are searched for and determined as either exact or partial matches and presented to the user. When the user determines that a match is the information of interest, the user creates a bounding box around the information of interest corresponding to the checklist. Once all the bounding boxes are created, each checklist item has a bounding box having x-y position coordinates for its bounds and characters associated with the checklist. Additionally, in some configurations, a portion of the bounding box may be for a value and a portion may be for a character identifier. In this way, when the checklist item is identified in a document for comparison, the checklist item is identified on the basis of its position and the character identifier portion of the item, and the value portion is not used for identification. Instead, the value portion in the original document/form may be presented to compare to the value portion in the comparison document.

In step 75, the user is presented with the checklist items in order to confirm matches. This occurs by either navigating the user automatically to each checklist item or presenting a list that the user may then use to navigate to each item or a combination thereof. At each checklist item, a text field may be presented showing the check list item and the match determined. In some scenarios this may include only exact matches, but in many scenarios the VEGR will return the closest matched determined based on a combination of positional and textual matching.

In step 50, the original document/form is compared to the comparison document. This is done using the bounding box position and the character information from the OCR off of the documents. In some cases, locations of values from comparison are established in relation to each checklist item. In such a scenario, in step 70, values are extracted in relation to each checklist item. This performed according to when a word representing characters of interest is found, adjacent areas are searched, based on x-y position (up, down, left, right) that may include a relevant value of interest, based on values that typically occur, for extraction. In step 75, the user is presented with checklist items. The user then confirms or rejects the matches. This is done via presenting the items on a checklist showing the matched checklist item and value if applicable. Additionally, the VEGR system may automatically navigate the user to the portion of the document where the match was made (comparison document—the system may also show the original/form compared side by side). In many scenarios, in step 80, the user may correct errors in matching. In many scenarios, a positive match may be incorrect, or a negative match may be incorrect, and the user may need to manual access the comparison document to determine the matching item. In many scenarios, in step 50, when the matching is preformed, those matches which are close but not exact are also presented. In this way the user may be presented with a match that is similar and may be the match the user is seeking. In some scenarios, the form or original which the matching in step 50 may be off and may need to be manual corrected and in step 85, the user may determine the need for correction. In step 90, the user may modify the form or original meta data that represents the characteristic of the original document. The bounding box may be mispositioned and the user may manually redraw this or the OCR identification on one or more characters may need to be adjusted. In step 95, if additional documents need to be reviewed, then the user proceeds to do so. If not, the process continues.

In one embodiment, VEGR includes multiple pre-steps. Multiple strategies may be utilized in VEGR systems. In some configurations, VEGR is deployed in the context of a Policy Checking Next Generation (PCNG) application function by analyzing and manipulating the text that makes up a Policy Checking PDF expiring/renewal document. In many configurations, a first step in the process is text identification and bounding box location and identification. In many configurations, regardless of the context, documents to be reviewed first are run through an AWS Textract (OCR Services) (or other OCR service) to extract the text from the original PDF documents. Textract (or other OCR service) takes the PDF documents as its input and returns a JSON response (JavaScript Object Notation) containing all the document's words and lines (multiple words) as its output. Every word or line that Textract returns contain a Bounding Box. The Bounding Box consists of four variables: left (the x-coordinate of the bounding box), top (the y-coordinate of the bounding box), width (how wide the bounding box is), and height (how tall the bounding box is). This information allows is used to create algorithms to classify and extract information from the documents.

In a second part of embodiments of a VEGR process, extraction occurs. One possible extraction method is a bookend match. In a bookend match, a method for locating and extracting phrases from a PDF document using line-based calculations is used. The method uses the distance formula to create lines that span the entire width of a document. Once these new lines have been created, they are then normalized and sorted. The method then loops through the entire document and matches a given list of words against the new lines generated from the above step. Using the Jaro Winkler Distance algorithm and the Dice Coefficient algorithm, the method then determines how similar the two words are. If the lines are determined to be a match, then the method returns a positive match.

For example, the process may include, first selecting a document for processing. In many scenarios, the document may be a pdf. Then the document is processed for text extraction. In many configurations, AWS Textract is used for processing. Then the identified words and the lines from the document are returned. As noted above, as part of this process, bounding boxes are created. In many embodiments, this processing returns information in JSON format. Subsequently, a list is creating that includes all of the identified lines. By the term lines in this section, it is meant that these are lines of text (alphanumeric characters). Next, the y coordinates are extracted from the bounding boxes that were previously created. Subsequently, a distance formula is used to determine what lines are on the same y-axis. Then a new line with the lines that are on the same y-axis. Then a new list is created that contains all the new lines from the previous step. Then the lines are converted to all lowercase letters. Subsequently, special characters are striped from the lines. Then the lines are alphabetized. Subsequently, a word or phrase is used for extraction according to a Horizontal Match. The word or phrase for extraction is a word or phrase of interest, in that the word or phrase has special meaning to the document reviewer. The lowercased lines previously created are then searched for the word or phrase for extraction. Then Jaro Winkler Distance and Dice Coefficient algorithms to determine how similar the word/phrase from for extraction is to the lowercased lines. The comparison process is continued for negative matches. Then the lines from the list that have positive matches are extracted.

In another configuration, a bookend match may include a method for locating and extracting phrases using tokens. In this configuration, the system loops through every word in a document (pdf) to locate all instances where a first and last token exist. The method then uses the Jaro Winkler Distance algorithm to determine the similarity between the first/last tokens and the words on the PDF document. If the method can locate the first token and the last token within the same page on the document, then the method uses the distance formula to determine the proximity of the two tokens on the page. If the proximity of the two tokens is less than the specified max distance, then a bounding box is created with the help of the Pythagoras Theorem using those two tokens, and a positive match is returned.

One embodiment of a summary of this procedure is as follows. First the document for processing is retrieved. Then the document is processed for text extraction. In many configurations, AWS Textract is used for processing. Then the identified words and the lines from the document are returned. As noted above, as part of this process, bounding boxes are created. In many embodiments, this processing returns information in JSON format. Then the word or phrase is tokenized. Tokenization is a process of breaking a word or phrase into smaller, identifiable parts. Typically, in the case of a phrase, this involves dividing it into words, but in alternatives, the tokens created may be subparts of words or other identifiable aspects. Practically, in this configuration, a phrase may include multiple words and it may be efficient for the system to search for the first word in the phrase, and then the last word in the phrase. In the next step of this method, the first token of the tokenized list is searched for. In the next step of this method, the last token of the tokenized list is searched for. Thereafter, all of the words in the list are looped through. Next the Jaro Winkler Distance algorithm to determine if the token from either the first token search or the last token search are similar any of the words searched for. Then the page number of any token match is identified. The page number of the token match is analyzed to see if matches any of the page numbers for the matched tokens from the first token of the tokenized list search or the last token of the tokenized list search. If a match is found, a distance formula is used to determine the proximity of a token from the first token of the tokenized list search to a token of the last token of the tokenized list search. Finally, the Pythagoras Theorem is used to generate a new bounding box using the x, y coordinates of the token from Step.

Additionally, embodiments of VEGR include a regex form extraction. In this procedure the method runs a series of regexes against all the words on a document. If the regex matches with a word, the method classes the word as a form, as the regexes were explicitly created to match words that are forms. More regexes can be created whenever a new type of form is introduced or a current form changes. In this process, a document is received for processing. Then the document is processed for text extraction. In many configurations, AWS Textract is used for processing. Then the identified words and the lines from the document are returned. As noted above, as part of this process, bounding boxes are created. In many embodiments, this processing returns information in JSON format. A list of all the words is created. Then all the words are looped through, and the words are subsequently compared to a list of regexes. Words are then classified as being a form if a match is found. Then they are classified as not being a form if a match is not found.

Additionally, embodiments of VEGR may include text pattern identification. The method finds text patterns that match potential forms by leveraging generic form characteristics. Some of these generic form characteristics include: Form number is larger than five characters; and form number includes numbers. Once a potential form is identified, the method checks to see if another form on the same page has the same text pattern. If so, then that page is identified as a form page. Likewise, if another potential form is identified on the following page, then even if only one has been identified on this page, it will be marked as a form page.

One embodiment of a summary of this procedure is as follows. First the document for processing is retrieved. Then the document is processed for text extraction. In many configurations, AWS Textract is used for processing. Then the identified words and the lines from the document are returned. As noted above, as part of this process, bounding boxes are created. In many embodiments, this processing returns information in JSON format. A list of all the words is created. Then all the words are looped through, and the words are subsequently checked to see if the word is longer than five characters. Then the word is checked to see if it includes numbers. Then the word is checked to see if the x, y coordinate of the word matches the x, y coordinate of an accurately classified form. Then the word is classified as a form if matches are found for the word being larger than five letters, including a number, and if it matches the coordinate. Then the page is classified as containing forms if matches are found for the word being larger than five letters, including a number, and if it matches the coordinate.

Additionally, embodiments of VEGR may include linear search identification. The method identifies whether a document contains a given set of words/lines (identifiers) using linear search. The method is used to classify documents based on their carrier, line of business or determine if a page contains forms. The method has three options when searching for identifiers within a document, 1. match all identifiers within a single page; 2. Match all identifiers within a single line; and 3. Match a line identifier against a single line.

In many embodiments, a method of matching all identifiers within a single page includes a number of steps. This option looks to match all the identifiers given to it within a single page in a document. If all the identifiers are not found within a single page in the document, the match will return as false. For example, the identifiers "Liberty" and "Mutual" may be used. If both "Liberty" and "Mutual" are present on the same page, then true will be returned. The order of which "Liberty" and "Mutual" appear on the page does not matter, nor do the coordinates of the identifiers. "Liberty" can be on the top of the page and "Mutual" on the very bottom. If they are on the same page, a positive match will be returned.

In many embodiments, a method of matching identifiers on a single line is used. This option takes a more conservative approach to match identifiers within a document in that it requires the identifiers to exist within the same line (y-axis) for it to return a positive match. For example, say that there are the identifiers "Cincinnati" and "Financial." Both "Cincinnati" and "Financial" need to exist on the same line (y-axis) for a positive match to be returned. If "Cincinnati" is on line one, and "Financial" is on line two, then a positive match will not be returned.

In many embodiments, a method of matching a line identifier against a single line used. This option works similar to option "Match all identifiers within a single line", with one main difference, the identifier contains a phrase instead of a single word. For example, instead of having four different identifiers ("The," "Cincinnati," "Financial," "Insurance"), there is one single identifier ("The Cincinnati Financial Insurance"). Linear Search Identification will look for that entire phrase to exist within a single page, to return a positive match. The method can configure a boundary to where to search for identifiers based on a set dimension for all three identifiers. For example, it might be desirable only to search for the identifier "Chubb" on the left corner of the page, 300 pixels from the top and 200 pixels from the left. Setting the Search Dimension allows us to restrict the strategy to those coordinates. Otherwise, the identifier is searched for on the entire page. The Jaro Winker Distance algorithm determines if a match is positive or negative.

Additionally, in some embodiments, radial extraction is used. The method works by first looping through the entire document and linking each word within the document to the words that lie to the left, right, top, and bottom of themselves. Next, the location of the words using their x and y coordinates is determined. Once each word is linked, the method loops through the entire document to find specific checklist item's names. If we find a checklist item, then the method will look to see if any of the words that have been linked to it have a value that matches what the checklist item uses typically. If it does, the method will extract both the name of the checklist item and the value. For example, say the system are looking for the word "premium" and the value "$5,000". Using the Radial Extraction algorithm, we would first look for the work "premium" with the policy document. If we find the word "premium," then the system looks to see what word is to the left of it, what word is above it, what word is to the right, and what word is to the bottom. If any of those words within those coordinate planes match a number like "$5,000", then the system considers the match to be positive and extract all the values. This strategy extracts checklist items with high accuracy without using any 3rds party vendors.

In some embodiment, a bounding box forms finder is used. The method works by manually running through a series of documents to determine, on average, the number of bounding boxes that are present before the system finds a page that contains forms. Using this information, the method is able to identify quickly forms pages within the document.

In some embodiments, an image-based form finder is used. The method works by analyzing the pages within the Expiring and Renewal documents as images, instead of analyzing the text that makes up the documents. In other words, the system goes from analyzing a page as a word document made up of hundreds of words and instead think of the page as a canvas that contains a lot of "shapes". The position and structure of these shapes are then analyzed for patterns that provide valuable information to the Policy Checking Next Generation application, an embodiment of a VEGR. This change in paradigm improves the processing speed and accuracy of VEG and change how the analysis typically functions.

Figure 33:
FIG. 33 includes an example of a page that contains forms for comparison.

One use case for this kind of analysis is determining which pages within a document contain forms. Forms are usually in the format of a series of alphanumeric digits that are unique to that document. For example, this is a form: MP T0 25 02 05. These forms are all displayed on the same page within an insurance policy document, usually one right after the other in a vertical fashion. FIG. 33 includes an example of a page that contains forms. An important feature of the Policy Checking Next Generation application is determining which pages contain forms and then exporting those forms to an excel document. This brings us back to the Image- Based Form Classification. As can be deduced by the image above, the page's overall structure that contains forms is somewhat uniform. Therefore, using Image-Based Form Classification, we can scan all the pages within a document to determine which ones include forms. This will allow us to quickly direct a user to the pages containing forms without knowing what the text inside the document is.

In many embodiments, a strategy implementation includes multiple aspects. The first step in implementing Image-Based Form Classification is to run the document through AWS Textract. This gives access to bounding boxes that surround all the text within the document. Then they are filled in so that a page containing only a series of black bars is left. An image is then generated that includes these new black bars and then compare that to a template image that looks similar using image matching algorithms. FIG. 34 shows an example of such an image. The image is named with its page number. This allows the system to help navigate the user quickly to the forms pages for Forms Comparison.

In many embodiments a feedback loop is included. The Feedback Loop is the process used by the Policy Checking Next Generation (PCNG) application to provide highly accurate results when extracting or classifying data when working with policy documents, even with documents from carriers and lines of businesses that have not been previously processed. The Feedback Loop has been tested in classifying pages containing forms and extracting the forms from those pages. Testing has shown that this mechanism can serve as the core of a more extensive system that allows for increased accuracy and speed when extracting and classifying data of interest.

When an Insurance Process Executive (IPE) first loads the PCNG application, a service call is made that returns various pieces of information to the application. Among that information are the pages and forms that the Feedback Loop has been able to find within the insurance policy documents. For any given policy, suppose the Feedback Loop mechanism can locate the pages containing the schedule of forms. In this case, those pages are displayed to the IPE when they navigate to the Forms Comparison dashboard so that the IPE can perform a final check. If the check passes, then the IPE's job is done. After that, no further action is taken by the Feedback Loop. If the Feedback Loop can't locate any pages of interest, then the IPE must manually find those pages. In this scenario, the process does not end when the pages/forms have been manually identified. Instead, a service call is made to the Feedback loop containing the x, y coordinates of the bounding boxes belonging to the forms. These x, y coordinates are fed into a Decision Tree classifier that predicts which x, y values belong to a form bounding box. The next time an IPE loads the PCNG application with a work order containing documents like the ones analyzed before, the IPE will be taken to the pages containing forms, with the forms highlighted on the document.

The Feedback Loop uses a Decision Tree classifier from the Scikit-Learn library to provide a supervised learning approach for extracting/classifying forms. For the POC of the Feedback Loop, a Decision Tree was chosen due to its ease of use and simple data requirements. However, in alternatives, more robust algorithms are being explored to replace it. Among them are Naive Bayes, Kalman Filter, or Particle Filters.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

In various instances, parts of the method may be implemented in modules, subroutines, or other computing structures. In many embodiments, the method and software embodying the method may be recorded on a fixed tangible medium.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof. In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc

We claim:

1. A method of automatic extraction of values, the method comprising:

scanning a document and linking a first word of a plurality of words in the document, to each word of the plurality of words in the document positionally adjacent to the right, left, top, bottom of the first word;

repeating said scanning and linking for every word of the plurality of words in the document;

determining the x and y coordinate in the document for each of the plurality of words;

providing a plurality of checklist words corresponding to information of interest;

searching the plurality of words in the document for each of the plurality of checklist words;

for each checklist word found in the plurality of words of the documents determining if a linked positionally adjacent words to the right, left, top, bottom is a value that matches typical values for the plurality of checklist words and if so, extract said value, directing a user interface to position in the document related to content of interest related to at least one of the plurality of checklist words.

2. The method of claim 1, further comprising: creating a bounding box for each word of the plurality of words.

3. The method of claim 2, further comprising: extracting y coordinates of the bounding boxes for each word of the plurality of words.

4. The method of claim 3, further comprising: determining what words of the plurality of words are on the same y-axis using a distance formula and creating a line for each set of words of the plurality of words that are on the same line, creating a plurality of lines.

5. The method of claim 4, further comprising: converting the plurality of lines to lower case.

6. The method of claim 5, further comprising stripping special characters from the plurality of lines.

7. The method of claim 6, further comprising: alphabetizing the plurality of lines.

8. The method of claim 7, further comprising determining how similar each of the plurality of checklist words is to the plurality of lines to perform the searching the plurality of words in the document for each of the plurality of checklist words.

9. The method of claim 8, wherein the Jaro Winkler Distance and Dice Coefficient algorithms are used in the determining how similar each of the plurality of checklist words is to the plurality of lines.

10. A system for automatic extraction of values comprising:

a module executing instructions in non-transitory digital storage medium to scan a document and link a first word of a plurality of words in the document, to each word of the plurality of words in the document positionally adjacent to the right, left, top, bottom of the first word;

repeat said scanning and linking for every word of the plurality of words in the document;

determine the x and y coordinate in the document for each of the plurality of words;

provide a plurality of checklist words corresponding to information of interest;

search the plurality of words in the document for each of the plurality of checklist words;

for each checklist word found in the plurality of words of the documents determine if a linked positionally adjacent words to the right, left, top, bottom is a value that matches typical values for the plurality of checklist words and if so, extract said value, direct a user interface to position in the document related to content of interest related to at least one of the plurality of checklist words.

11. The system of claim 10, wherein the module further creates a bounding box for each word of the plurality of words.

12. The system of claim 11, wherein the module further extracts y coordinates of the bounding boxes for each word of the plurality of words.

13. The system of claim 12, wherein the module further determines what words of the plurality of words are on the same y-axis using a distance formula and creating a line for each set of words of the plurality of words that are on the same line, creating a plurality of lines.

14. The system of claim 13, wherein the module further converts the plurality of lines to lower case.

15. The system of claim 14, wherein the module further strips special characters from the plurality of lines.

16. The system of claim 15, wherein the module further alphabetizes the plurality of lines.

17. The system of claim 16, wherein the module further determines how similar each of the plurality of checklist words is to the plurality of lines to perform the searching the plurality of words in the document for each of the plurality of checklist words.

18. The system of claim 17, wherein the Jaro Winkler Distance and Dice Coefficient algorithms are used in the determining how similar each of the plurality of checklist words is to the plurality of lines.

19. The system of claim 18, wherein the words are tokenized.

20. A non-transitory digital storage medium having a computer program stored thereon to perform a method for transforming and improving the processing of information and records data related documents, the method comprising:

scanning a document and linking a first word of a plurality of words in the document, to each word of the plurality of words in the document positionally adjacent to the right, left, top, bottom of the first word;

repeating said scanning and linking for every word of the plurality of words in the document;

determining the x and y coordinate in the document for each of the plurality of words;

providing a plurality of checklist words corresponding to information of interest;

searching the plurality of words in the document for each of the plurality of checklist words;

for each checklist word found in the plurality of words of the documents determining if a linked positionally adjacent words to the right, left, top, bottom is a value that matches typical values for the plurality of checklist words and if so, extract said value, directing a user interface to position in the document related to content of interest related to at least one of the plurality of checklist words.

* * * * *